US007174237B2

(12) United States Patent
Takayama et al.

(10) Patent No.: US 7,174,237 B2
(45) Date of Patent: Feb. 6, 2007

(54) ENDLESS-MOVING-MEMBER DRIVING UNIT, IMAGE FORMING APPARATUS, PHOTOSENSITIVE-ELEMENT DRIVING UNIT, AND METHOD OF DEGRADATION PROCESS FOR ENDLESS MOVING-MEMBER

(75) Inventors: Hideyuki Takayama, Kanagawa (JP); Koichi Kudo, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 237 days.

(21) Appl. No.: 10/927,344

(22) Filed: Aug. 27, 2004

(65) Prior Publication Data

US 2005/0137745 A1 Jun. 23, 2005

(30) Foreign Application Priority Data

Aug. 29, 2003 (JP) ............................ 2003-305651
Jul. 6, 2004 (JP) ............................ 2004-198784

(51) Int. Cl.
*G06F 7/00* (2006.01)

(52) U.S. Cl. ...................................................... 700/230

(58) Field of Classification Search ................ 700/230, 700/213, 229; 399/167, 301; 347/116
See application file for complete search history.

(56) References Cited

U.S. PATENT DOCUMENTS

| | | | | |
|---|---|---|---|---|
| 5,266,976 | A * | 11/1993 | Ohigashi et al. | 347/116 |
| 5,574,558 | A | 11/1996 | Kudo et al. | |
| 5,729,024 | A | 3/1998 | Baba et al. | |
| 5,818,062 | A | 10/1998 | Baba et al. | |
| 5,929,436 | A | 7/1999 | Baba et al. | |
| 6,252,682 | B1 | 6/2001 | Baba et al. | |
| 6,665,239 | B1 | 12/2003 | Takahashi et al. | |
| 6,774,355 | B2 | 8/2004 | Kudo | |
| 6,842,602 | B2 * | 1/2005 | Kudo | 399/303 |
| 6,925,279 | B2 * | 8/2005 | Kamoshita et al. | 399/303 |
| 7,054,586 | B2 * | 5/2006 | Kuroda | 399/302 |
| 2003/0052957 | A1 | 3/2003 | Yamada et al. | |
| 2003/0053818 | A1 | 3/2003 | Kimura | |
| 2003/0223786 | A1 | 12/2003 | Kamoshita et al. | |
| 2004/0022557 | A1 | 2/2004 | Kudo | |
| 2004/0141775 | A1 | 7/2004 | Sakai | |
| 2004/0160646 | A1 | 8/2004 | Kudo et al. | |
| 2004/0170455 | A1 | 9/2004 | Shintani et al. | |
| 2004/0184831 | A1 | 9/2004 | Isobe | |
| 2004/0190944 | A1 | 9/2004 | Kita | |
| 2004/0197111 | A1 | 10/2004 | Kuroda | |

FOREIGN PATENT DOCUMENTS

| | | |
|---|---|---|
| JP | 6-263281 | 9/1994 |
| JP | 9-114348 | 5/1997 |
| JP | 3107259 | 9/2000 |

* cited by examiner

*Primary Examiner*—Khoi H. Tran
(74) *Attorney, Agent, or Firm*—Oblon, Spivak, McClelland, Maier & Neustadt, P.C.

(57) ABSTRACT

A scale having marks disposed at a predetermined interval is provided on an intermediate transfer belt. A sensor detects the scale and outputs a binary signal. A counter counts a wave number of the binary signal. The wave number of the binary signal detected when the sensor detects a normal scale within a predetermined time is stored in a memory. A difference between the wave number stored and a wave number counted within a same period of time as the predetermined time is greater than a predetermined value, degradation of the scale and a change in a control of speed of the intermediate transfer belt into a control by a dummy signal is displayed on a display.

18 Claims, 29 Drawing Sheets

ENDLESS-MOVING-MEMBER DRIVING UNIT, IMAGE FORMING APPARATUS, PHOTOSENSITIVE-ELEMENT DRIVING UNIT, AND METHOD OF DEGRADATION PROCESS FOR ENDLESS MOVING-MEMBER

CROSS-REFERENCE TO RELATED APPLICATIONS

The present document incorporates by reference the entire contents of Japanese priority documents, 2003-305651 filed in Japan on Aug. 29, 2003 and 2004-198784 filed in Japan on Jul. 6, 2004.

BACKGROUND OF THE INVENTION

1) Field of the Invention

The present invention relates to an endless-moving-member driving unit, an image forming apparatus, a photosensitive-element driving unit, and a degradation process of endless moving-member. More specifically, the present invention relates to an endless-moving-member driving unit that performs different controls for speed and position of an endless moving-member from regular controls when a defective portion is detected in the endless moving-member.

2) Description of the Related Art

Some image forming apparatuses such as a color copy machine include photosensitive drum belt and an intermediate transfer belt, which are endless moving-members that include endless belt.

In such a color copy machine, it is necessary to accurately control a speed or a position of the photosensitive-drum belt and the intermediate transfer belt because if a position adjustment of different color images (toner images) on the photosensitive-drum belt or the intermediate transfer belt is not accurate, it results in a color shift in an image.

Similarly, in an image forming apparatus in which a transferring material that transfers an image is carried by the endless moving-member, which includes the endless belt, it is necessary to accurately control the speed or the position of the endless moving-member because an inaccurate control of the speed or the position causes the color shift in an image.

In a conventional endless-moving-member driving unit, as it has been disclosed in Japanese Patent No. 3107259, a rotary encoder that detects an angular speed of the rotating body is coupled directly to an axis of a rotating body (the endless moving-member), and a rotational angular speed of a motor that drives the rotating body is controlled based on the angular speed detected by the encoder.

Moreover, in a conventional endless-moving-member driving unit, as it has been disclosed in, for example, Japanese Patent Application Laid-Open Publication No. H6-263281 (see FIG. 9 on page 4), a transfer belt, which is an endless moving-member, has marks on a surface of the transfer belt at regular interval along a direction of movement. The transfer belt is rotated at a constant speed, and an output pattern that is output upon detection of the marks by a sensor is stored in a memory as an output pattern relative to one of the marks. The pattern stored is a reference pattern for a first color. For an each color thereafter, the speed of the transfer belt is controlled such that an output pattern of the sensor corresponds with the reference pattern.

Similarly, in an endless-moving-member driving unit that has been disclosed in, for example, Japanese Patent Application Laid-Open Publication No. H9-114348 (see FIG. 8 on page 5), a recording-paper carrier belt, which is an endless moving-member, has marks on a surface of the recording-paper carrier belt at regular interval along the direction of movement. The movement of the recording-paper carrier belt is directly detected by detecting the marks by a mark detector, and the recording-paper carrier belt is controlled at an ideal belt speed.

However, according to the technology disclosed in the Japanese Patent No. 3107259, the speed of the rotating body is controlled based on the speed indirectly detected through the rotary encoder. Therefore, if the rotating body is formed with an elastic material such as rubber, and if the rotating body stretches or contracts while rotating, the speed cannot be controlled accurately.

The technologies disclosed in the Japanese Patent Application Laid-Open Publication No. H6-263281 and H9-114348 also have a problem. Although a method of forming the marks on the belt is not mentioned in the above patent literatures, since the transfer belt in the image forming apparatus is generally made of an elastic material such as rubber. Due to the flexibility and the deviation in the circumference of the belt, it is very difficult to provide the marks accurately at constant interval without a gap throughout the circumference.

If the marks are formed by preparing convex and concave portions in a mold with which the belt is formed, an annealing process is normally necessary for the molded belt after removing from the mold. During the annealing process, if the belt is not heated uniformly, it cannot realize the regular interval of the marks with high accuracy. Moreover, if an internal distortion that is developed in the molded belt, the coefficient of contraction becomes not even throughout the belt, it becomes difficult to arrange the marks at regular interval at high accuracy.

If the marks are provided by printing, or by sticking, on the belt, a material on which the marks are printed, a deviation occurs in the belt. For example, if a circumferential tolerance of 0.2% to 0.3%, for a 500 mm long belt, the deviation is not less than 1 mm. Therefore, it is difficult to form the marks accurately at regular interval without a gap.

In an arrangement where the speed control of the belt is performed by providing the marks to detect the speed of the belt, there is a problem in which breaks in signals, which is output from the sensor, occur not only when there is a gap in the marks regularly arranged, but also when there are dirty marks or damaged marks because the sensor cannot detect such marks.

In a typical image forming apparatus, units that use materials that cause contamination such as toner are used near the transfer belt; the transfer belt may get stained easily.

Regarding the gap of the marks, which is formed at a joint of the circumference, since presence of the gap and a position in the direction of movement on the belt are known, the gap can be detected by providing a mark for detecting the gap and a sensor to detect the gap. Therefore, the belt can be controlled to a constant speed by performing a different control from a regular control when the gap is detected.

However, the contamination and damage of the marks are not developed at an initial stage of the use, and tend to be gradually developed according to the elapse of time while using the equipment. Therefore, a position of the contamination and the damage developed in the direction of the movement on the belt is not known.

To cope with this problem, if the speed control is changed to a different control (an alternative control) from the regular control also when the signal output from the sensor is stopped due to the contamination and the damage, similarly to when the gap of the marks is detected, the speed of the belt can be controlled throughout the circumference of the belt.

However, when a faulty image is output after the speed control is changed to the alternative control (a dummy-signal control), a user cannot realize a reason of the faulty image is because the speed control is changed to the alternate speed control.

Furthermore, with the elapse of time, the contamination and the damage on the marks increase. As a result, the alternative control, which is less accurate compared to the control based on the marks, is frequently performed, and the problem above becomes more likely to occur.

SUMMARY OF THE INVENTION

It is an object of the present invention to solve at least the above problems in the conventional technology.

An endless-moving-member driving unit according to one aspect of the present invention includes an endless moving-member including portions to be detected that are formed at a predetermined interval; a detecting unit that detects the portions to be detected and outputs a result of detection as a binary signal; a counter that counts a wave number of the binary signal; a storage unit that stores the wave number of the binary signal that is output when portions to be detected are detected; a calculating unit that calculates a difference between the wave number stored in the storage unit and the wave number counted by the counter in a predetermined time arbitrarily set; and a warning display unit that displays a warning that indicates a state in which a different control from a normal control is executed when the difference between the wave numbers calculated exceeds a predetermined value.

An endless-moving-member driving unit according to another aspect of the present invention includes an endless moving-member including portions to be detected that are formed at a predetermined interval; a detecting unit that detects the portions to be detected and outputs an analog alternating signal modulated continuously; an error-signal outputting unit that outputs an error signal when the portions to be detected are not detected at the predetermined interval based on the change in the output level of the analog alternating signal; a counter that counts a wave number of the error signal; a storage unit that stores a wave number of the error signal that is output when the portions to be detected are detected within a predetermined time arbitrarily set; a calculating unit that calculates a difference between the wave number stored in the storage unit and a wave number that is counted by the counter within a same period of time as the predetermined time; and a warning display unit that displays a warning that indicates a change in a control of any of a speed and a position of the endless moving-member into a control that is different from a normal control when the difference between the wave numbers that is calculated by the calculating unit becomes greater than a predetermined value.

An endless-moving-member driving unit according to still another aspect of the present invention includes an endless moving-member including portions to be detected that is formed at a predetermined interval; a detecting unit that detects the portions to be detected, outputs an analog alternating signal modulated continuously, and converts the analog alternating signal into a binary signal; an error-signal outputting unit that outputs an error signal when the portions to be detected are not detected at the predetermined interval based on the change in the output level of the analog alternating signal; a counter that counts a wave number of the error signal that is output from the error-signal outputting unit; and a warning display unit that displays a warning that indicates a change in a control of any of a speed and a position of the endless moving-member to a control that is different from a normal control when the wave number of the error signal that is counted by the counter during a predetermined time voluntarily set becomes greater than a threshold value of a wave number of the error signal that is set in advance.

An endless-moving-member driving unit according to still another aspect of the present invention includes an endless moving-member including portions to be detected that are formed at a predetermined interval; a detecting unit that detects the portions to be detected, outputs an analog alternating signal modulated continuously, and converts the analog alternating signal to a binary signal; a counter that counts a wave number of the binary signal that is output when the detecting unit detects portions to be detected; an error-signal outputting unit that outputs an error signal when the portions to be detected are not detected at the predetermined interval based on a change in an output level of the analog alternating signal; a storage unit that stores a wave number of the binary signal that is output when the detecting unit detects the portions to be detected during a predetermined time voluntarily set where the error signal is not output; a calculating unit that calculates a difference between the wave number that is stored in the storage unit and the wave number that is counted by the counter within a same period of time as the predetermined time; and a warning display unit that displays warning that indicates a change in a control of any of a speed and a position of the endless moving-member into a control that is different from a normal control when the wave number calculated by the calculating unit becomes greater than a predetermined value.

An endless-moving-member driving unit according to still another aspect of the present invention includes an endless moving-member including portions to be detected that are formed at a predetermined interval; a detecting unit that detects the portions to be detected, outputs an analog alternating signal modulated continuously, and converts the analog alternating signal into a binary signal; an error-signal outputting unit that outputs an error signal when the portions to be detected are not detected to be at the predetermined interval based on a change in an output level of the analog alternating signal; a first counter that counts a wave number of the error signal that is output from the error-signal outputting unit; a first storage unit that sores the wave number of the error signal that is output from the error-signal outputting unit when the detecting unit detects portions to be detected during a predetermined time voluntarily set; a first calculating unit that calculates a difference between the wave number that is stored in the first storage unit when the portions to be detected are detected and the wave number of the error signal that is counted by the first counter within a same period of time as the predetermined time; a first judging unit that judges defective portions when the difference between the wave numbers calculated by the first calculating unit becomes greater than a predetermined value; a second counter that counts a wave number of the binary signal that is output by the detecting unit; a second storage unit that stores the wave number of the binary signal that is output when the detecting unit detects the portions to be detected during a predetermined time that is set voluntarily; a second calculating unit that calculates a difference between the wave number that is stored in the second storing unit and the wave number that is counted by the counter during a time interval same as the predetermined time; a second judging section that judges a defective portion to be detected when the difference between the wave numbers that is calculated by the second calculating unit becomes greater than a predetermined value; and a warning display unit that indicates a change in a control of any of a speed and a position of the endless moving-member to a control that is different from a normal control when at least any one of the first judging unit and the second judging unit detects the defective portions to be detected.

An endless-moving-member driving unit according to still another aspect of the present invention includes an endless moving-member including portions to be detected that are formed at a predetermined interval; a detecting unit that detects the portions to be detected and outputs an analog alternating signal modulated continuously; a reference-position mark that indicates a reference position in a direction of rotation of the endless moving-member; a reference-position mark detecting unit that detects the reference-position mark; an error-signal outputting unit that outputs an error signal when the portions to be detected are not detected to be at the predetermined interval by the detecting unit, based on the change in the output level of the analog alternating signal; a reference-waveform storage unit that stores a signal waveform, which is output from the error-signal outputting unit throughout one revolution of the endless moving-member at a timing of a start and an end of waveform fetching, the timing being a trigger signal when the reference-position mark detecting unit detects the reference-position mark during an initial period of use of the endless moving-member; and a warning display unit that compares the signal waveform for reference that is stored in the reference-waveform storage unit and a signal waveform, which is output from the error-signal outputting unit throughout one revolution of the endless moving-member at a timing of the start and the end of waveform fetching, the timing being the trigger signal after the endless moving-member is used for desired time, and displays a warning, which indicates a change in a control of any of a speed and a position of the endless moving-member to a control that is different from a normal control when a resultant value of the comparison of the waveforms becomes greater than a predetermined value.

An image forming apparatus according to still another aspect of the present invention includes an endless-moving-member driving unit that includes an endless moving-member including portions to be detected that are formed at a predetermined interval; a detecting unit that detects the portions to be detected and outputs a result of detection as a binary signal; a counter that counts a wave number of the binary signal; a storage unit that stores the wave number of the binary signal that is output when portions to be detected are detected; a calculating unit that calculates a difference between the wave number stored in the storage unit and the wave number counted by the counter in a predetermined time arbitrarily set; and a warning display unit that displays a warning that indicates a state in which a different control from the normal control is executed when the difference between the wave numbers calculated exceeds a predetermined value. The endless moving-member is an image carrier that rotates while carrying an image.

An image forming apparatus according to still another aspect of the present invention includes an endless-moving-member driving unit that includes an endless moving-member including portions to be detected that are formed at a predetermined interval; a detecting unit that detects the portions to be detected and outputs an analog alternating signal modulated continuously; an error-signal outputting unit that outputs an error signal when the portions to be detected are not detected at the predetermined interval based on the change in the output level of the analog alternating signal; a counter that counts a wave number of the error signal; a storage unit that stores a wave number of the error signal that is output when the portions to be detected are detected within a predetermined time arbitrarily set; a calculating unit that calculates a difference between the wave number stored in the storage unit and a wave number that is counted by the counter within a same period of time as the predetermined time; and a warning display unit that displays a warning that indicates a change in a control of any of a speed and a position of the endless moving-member into a control that is different from the normal control when the difference between the wave numbers that is calculated by the calculating unit becomes greater than a predetermined value. The endless moving-member is an image carrier that rotates while carrying an image.

An image forming apparatus according to still another aspect of the present invention includes an endless-moving-member driving unit that includes an endless moving-member including portions to be detected that is formed at a predetermined interval; a detecting unit that detects the portions to be detected, outputs an analog alternating signal modulated continuously, and converts the analog alternating signal into a binary signal; an error-signal outputting unit that outputs an error signal when the portions to be detected are not detected at the predetermined interval based on the change in the output level of the analog alternating signal; a counter that counts a wave number of the error signal that is output from the error-signal outputting unit; and a warning display unit that displays a warning that indicates a change in a control of any of a speed and a position of the endless moving-member to a control that is different from a normal control when the wave number of the error signal that is counted by the counter during a predetermined time voluntarily set becomes greater than a threshold value of a wave number of the error signal that is set in advance. The endless moving-member is an image carrier that rotates while carrying an image.

An image forming apparatus according to still another aspect of the present invention includes an endless-moving-member driving unit that includes an endless moving-member including portions to be detected that are formed at a predetermined interval; a detecting unit that detects the portions to be detected, outputs an analog alternating signal modulated continuously, and converts the analog alternating signal to a binary signal; a counter that counts a wave number of the binary signal that is output when the detecting unit detects portions to be detected; an error-signal outputting unit that outputs an error signal when the portions to be detected are not detected at the predetermined interval based on a change in an output level of the analog alternating signal; a storage unit that stores a wave number of the binary signal that is output when the detecting unit detects the portions to be detected during a predetermined time voluntarily set where the error signal is not output; a calculating unit that calculates a difference between the wave number that is stored in the storage unit and the wave number that is counted by the counter within a same period of time as the predetermined time; and a warning display unit that displays warning that indicates a change in a control of any of a speed and a position of the endless moving-member into a control that is different from a normal control when the wave number calculated by the calculating unit becomes greater than a predetermined value. The endless moving-member is an image carrier that rotates while carrying an image.

An image forming apparatus according to still another aspect of the present invention includes an endless-moving-member driving unit that includes an endless moving-member including portions to be detected that are formed at a predetermined interval; a detecting unit that detects the portions to be detected, outputs an analog alternating signal modulated continuously, and converts the analog alternating signal into a binary signal; an error-signal outputting unit that outputs an error signal when the portions to be detected are not detected to be at the predetermined interval based on a change in an output level of the analog alternating signal; a first counter that counts a wave number of the error signal that is output from the error-signal outputting unit; a first storage unit that sores the wave number of the error signal that is output from the error-signal outputting unit when the detecting unit detects portions to be detected during a predetermined time voluntarily set; a first calculating unit that calculates a difference between the wave number that is stored in the first storage unit when the portions to be detected are detected and the wave number of the error signal that is counted by the first counter within a same period of time as the predetermined time; a first judging unit that judges defective portions when the difference between the wave numbers calculated by the first calculating unit becomes greater than a predetermined value; a second counter that counts a wave number of the binary signal that is output by the detecting unit; a second storage unit that stores the wave number of the binary signal that is output when the detecting unit detects the portions to be detected during a predetermined time that is set voluntarily; a second calculating unit that calculates a difference between the wave number that is stored in the second storing unit and the wave number that is counted by the counter during a time interval same as the predetermined time; a second judging section that judges a defective portion to be detected when the difference between the wave numbers that is calculated by the second calculating unit becomes greater than a predetermined value; and a warning display unit that indicates a change in a control of any of a speed and a position of the endless moving-member to a control that is different from a normal control when at least any one of the first judging unit and the second judging unit detects the defective portions to be detected. The endless moving-member is an image carrier that rotates while carrying an image.

An image forming apparatus according to still another aspect of the present invention includes an endless-moving-member driving unit that includes an endless moving-member, which rotates and has portions to be detected formed at predetermined interval; a detecting unit that detects the portions to be detected and outputs an analog alternating signal modulated continuously; a reference-position mark that indicates a reference position in a direction of rotation of the endless moving-member; a reference-position mark detecting unit that detects the reference-position mark; an error-signal outputting unit that outputs an error signal when the portions to be detected are not detected to be at the predetermined interval by the detecting unit, based on the change in the output level of the analog alternating signal; a reference-waveform storage unit that stores a signal waveform, which is output from the error-signal outputting unit throughout one revolution of the endless moving-member at a timing of a start and an end of waveform fetching, the timing being a trigger signal when the reference-position mark detecting unit detects the reference-position mark during an initial period of use of the endless moving-member; and a warning display unit that compares the signal waveform for reference that is stored in the reference-waveform storage unit and a signal waveform, which is output from the error-signal outputting unit throughout one revolution of the endless moving-member at a timing of the start and the end of waveform fetching, the timing being the trigger signal after the endless moving-member is used for desired time, and displays a warning, which indicates a change in a control of any of a speed and a position of the endless moving-member into a control that is different from a normal control when a resultant value of the comparison of the waveforms becomes greater than a predetermined value. The endless moving-member is an image carrier that rotates while carrying an image.

A photosensitive-element driving unit according to still another aspect of the present invention includes a photosensitive drum that rotates and has portions to be detected formed along a circumference; detecting unit that detects the portions to be detected and outputs a result of the detection as a binary signal, in which, based on a change in the binary signal that is output, when the portions to be detected are not detected to be at the predetermined interval, a control of any of a speed and a position of the photosensitive drum changes to a control that is different from a normal control; a counter that counts a wave number of the binary signal that is output from the detecting unit; a storage unit that stores the wave number of the binary signal that is output when the detecting unit detects a normal portion to be detected; a calculating unit that calculates a difference between the wave number that is stored in the storage unit during a predetermined time that is set voluntarily and the wave number that is counted by the counter; and a warning display unit that displays a warning, which indicates a change in the control of any of a speed and a position of the photosensitive drum, to the control that is different from the normal control when the difference between the wave numbers that is calculated by the calculating unit becomes greater than a predetermined value.

A photosensitive-element driving unit according to still another aspect of the present invention includes a photosensitive drum, which rotates and has portions to be detected formed at predetermined interval; a detecting unit that detects the portions to be detected and outputs an analog alternating signal, which is modulated continuously, in which, based on a change in an output level of the analog alternating signal that is output from the detecting unit, when the portions to be detected are not detected to be at the predetermined interval, a control of any of a speed and a position of the photosensitive drum changes to a control that is different from a normal control; an error-signal outputting unit that outputs an error signal when the portions to be detected are not detected to be at the predetermined interval, based on the change in the output level of the analog alternating signal; a counter that counts a wave number of the error signal that is output from the error-signal outputting unit; a storage unit that stores a wave number of the error signal that is output from the error-signal outputting unit when the detecting unit detects portions to be detected during a predetermined time, which is set voluntarily; a calculating unit that calculates a difference between the wave number when the portions to be detected are detected, that is stored in the storage unit and a wave number of the error signal that is counted by the counter during a time interval same as the predetermined time; and a warning display unit that displays a warning, which indicates a change in the control of any of a speed and a position of the photosensitive drum to the control that is different from the normal control when the difference between the wave numbers that is calculated by the calculating unit becomes greater than a predetermined value.

A photosensitive-element driving unit according to still another aspect of the present invention includes a photosensitive drum, which rotates and has portions to be detected formed at predetermined interval; a detecting unit that detects the portions to be detected and outputs an analog alternating signal, which is modulated continuously, in which, based on a change in an output level of the analog output signal that is output from the detecting unit, when the portions to be detected are not detected to be at the predetermined interval, a control of any of a speed and a position of the photosensitive drum changes to a control that is different from a normal control; a reference-position mark that indicates a reference position in a direction of rotation of the photosensitive drum; a reference-position mark detecting unit that detects the reference-position mark; an error-signal outputting unit that outputs an error signal when the portions to be detected are not detected to be at the predetermined interval by the detecting unit, based on the change in the output level of the analog alternating signal; a reference-waveform storage unit that stores a signal waveform, which is output from the error-signal outputting unit throughout one revolution of the photosensitive drum at a timing of a start and an end of waveform fetching, the timing being a trigger signal when the reference-position mark detecting unit detects the reference-position mark during an initial period of use of the photosensitive drum; and a warning display unit that compares the signal waveform for reference that is stored in the reference-waveform storage unit and a signal waveform, which is output from the error-signal outputting unit throughout one revolution of the photosensitive drum at a timing of the start and the end of waveform fetching, the timing being the trigger signal after the photosensitive drum is used for desired time, and displays a warning, which indicates a change in the control of any of a speed and a position of the photosensitive drum to the control that is different from the normal control when a resultant value of the comparison of the waveforms becomes greater than a predetermined value.

A method of degradation process according to still another aspect of the present invention includes storing a wave number of the binary signal that is output when the detecting unit detects portions to be detected during a predetermined time that is set voluntarily, by a storage unit; counting a wave number of the binary signal that is output from the detecting unit by a counter during a time interval same as the predetermined time; calculating a difference between the counted value and the wave number that is stored in the storage unit; and displaying a warning, which indicates degradation of the portions to be detected and a change in a control of any of a speed and a position of the endless moving-member into a control that is different from a normal control when the difference between the wave numbers that is calculated by the calculating unit becomes greater than a predetermined value.

A method of degradation process according to still another aspect of the present invention includes storing a wave number of the error signal that is output from the error-signal outputting unit by a storage unit, based on the change in the output level of the analog alternating signal when the detecting unit detects portions to be detected during a predetermined time, which is set voluntarily; counting a wave number of the error signal by a counter during a time interval same as the predetermined time; calculating a difference between a counted value of the wave number of the error signal when the portions to be detected are detected, stored in the storage unit; and displaying a warning that indicates degradation of the portions subjected to degradation and a change in a control of any of a speed and a position of the endless moving-member into a control that is different from a normal control when the difference between the wave numbers that is calculated by the calculating unit becomes greater than a predetermined value.

A method of degradation process according to still another aspect of the present invention includes starting fetching a signal waveform of an error signal that is output based on the change in the output level of the analog alternating signal by starting fetching a signal that is output by the detecting unit based on a trigger signal when a reference-position mark detecting unit detects a reference-position mark that is provided in a direction of rotation of the endless moving-member during an initial period of use of the endless moving-member; ending fetching of the signal waveform when the trigger signal is output once again upon one revolution of the endless moving-member; storing a signal waveform of the error signal that is fetched during one revolution of the endless moving-member, in a reference-waveform storage unit; comparing a signal waveform for reference that is stored in the storage unit and a signal waveform of the error signal that is fetched throughout one revolution of the endless moving-member at a timing of a start and an end of fetching waveform, the timing being a trigger signal after the endless moving-member is used for desired time; and displaying a warning, which indicates degradation of the portions to be detected and a change in a control of any of a speed and a position of the endless moving-medium into a control that is different from a normal control when a resultant value of the comparison of the waveforms becomes greater than a predetermined value.

The other objects, features, and advantages of the present invention are specifically set forth in or will become apparent from the following detailed description of the invention when read in conjunction with the accompanying drawings.

DETAILED DESCRIPTION

Exemplary embodiments of an endless-moving-member driving unit, an image forming apparatus, a photosensitive-element driving unit, and a method of degradation process of the endless moving-member according to the present invention are described in detail below with reference to the accompanying drawings.

Figure 1:
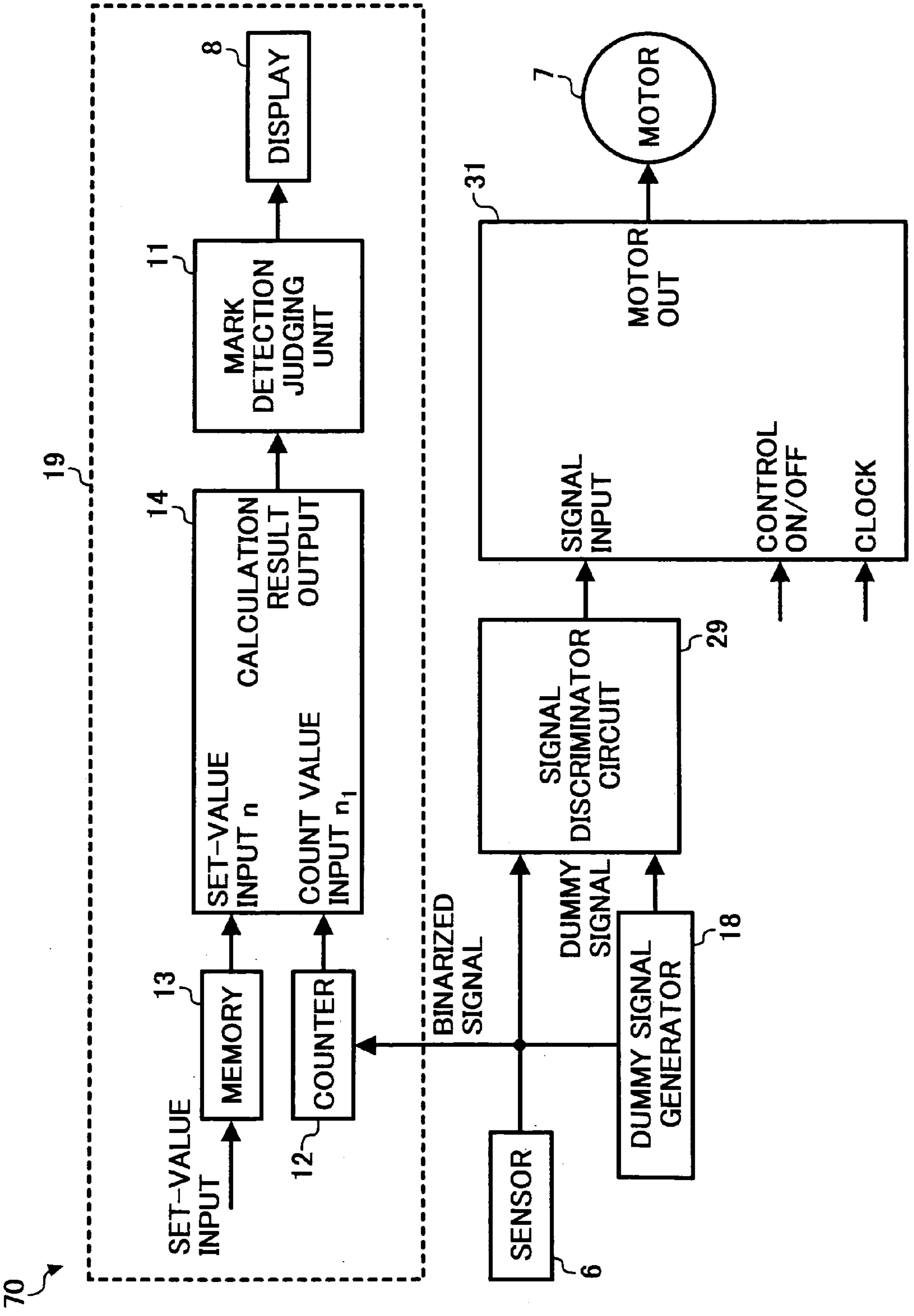
FIG. 1 is a block diagram of a control system of an endless-moving-member driving unit according to an embodiment A1 of the present invention.
Figure 2:
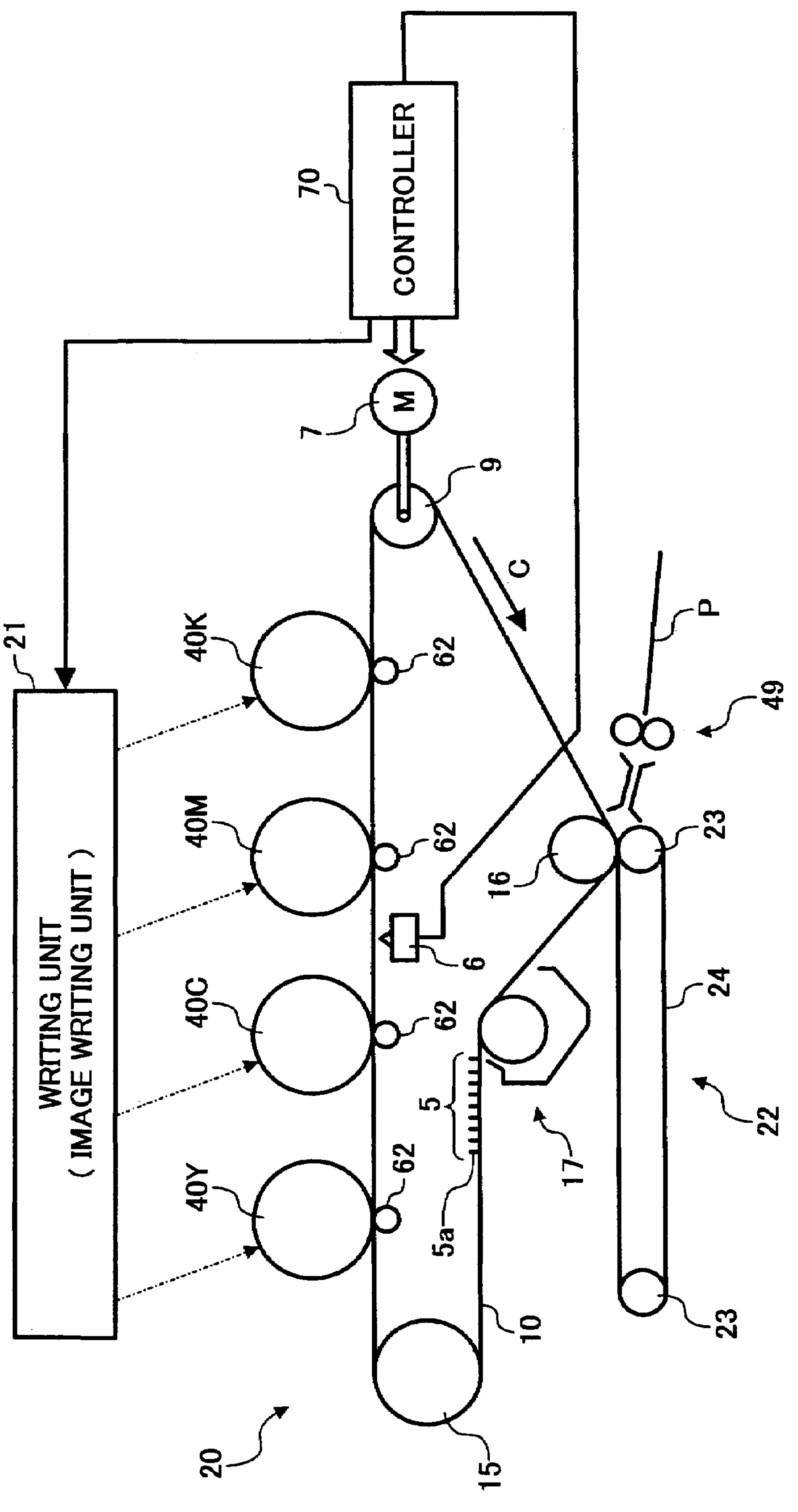
FIG. 2 is a schematic of an intermediate transfer unit as an example of the endless-moving-member driving unit according to the embodiment A1 of the present invention.
Figure 3:
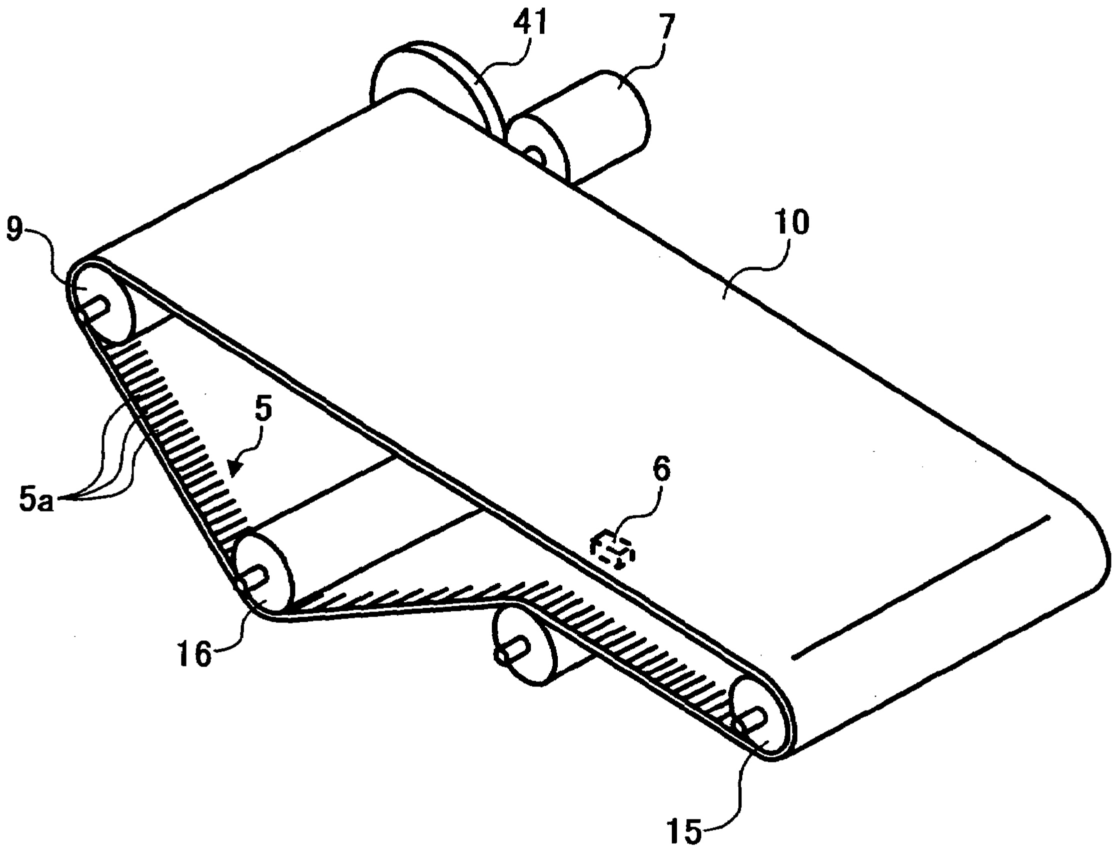
FIG. 3 is a perspective view of an intermediate transfer belt and a drive system provided in the intermediate transfer unit according to the embodiment A1.

FIG. 1 is a block diagram of a control system of the endless-moving-member driving unit according to the present invention. FIG. 2 is a schematic diagram illustrating an intermediate transfer unit, which is the endless-moving-member driving unit. FIG. 3 is a perspective view of an intermediate transfer belt and a drive system provided in the intermediate transfer unit.

According to an embodiment A1, an intermediate transfer belt 10 in an image forming apparatus is an endless moving-member. As shown in FIG. 2, an intermediate transfer unit 20, which is the endless-moving-member driving unit, includes the intermediate transfer belt 10 and a sensor 6. The intermediate transfer belt 10 is the endless moving-member that rotates. A scale 5 is provided with marks as portions to be detected along the circumference of the intermediate transfer belt 10. The scale 5 includes a plurality of marks (such as holes etc.) 5*a* (shown partly in FIG. 2) at predetermined interval. The sensor 6 functions as a detecting unit that binarizes a result of detection of the scale 5 and outputs to a controller 70.

The controller 70 detects defective portions, which are not detected to be at the predetermined interval on the scale 5 based on a change in a binary signal that is output from the sensor 6. When the defective portions are detected, the controller changes a control of speed (or of position) of the intermediate transfer belt 10 to a dummy-signal control that differs from the normal control.

As shown in FIG. 1, the controller 70 of the intermediate transfer unit 20 includes a mark-degradation monitoring system 19. The mark-degradation monitoring system 19 includes a counter 12, a memory 13, an arithmetic circuit 14, and a mark-detection judging section 11. The counter 12 counts a wave number of the binary signal that is output from the sensor 6. The memory 13 (rewritable, readable) is a storage unit that stores a wave number n of the binary signal that is output when the sensor 6 detects a normal scale 5 during a predetermined time $t_1$, which is set voluntarily. The arithmetic circuit 14 is a calculating unit that calculates a difference between the wave number n that is stored in the memory 13 and a wave number $n_1$ that is counted by the counter 12 during a time interval same as the predetermined time $t_1$. The mark-detection judging section 11 functions as a warning display unit that controls to display warnings on the display 8, which is disposed at a position visible from outside. The warnings displayed on the display 8 include warnings such as an indication of degradation of the scale 5 and a change of a normal speed control to an alternate speed control (dummy-signal control). The mark-detection judging section 11 judges the scale 5 to be defective when the difference between the wave numbers n and $n_1$ calculated by the arithmetic circuit 14 becomes greater than the predetermined value, and causes the display indicating the degradation of the scale 5.

Apart from the display of a warning on the display 8 that is visible from outside, the warning may be made by displaying on a multi-layered hierarchy of an operation panel, which is operated by a user, or by emission of light from an LED etc., or by changing a color of light emitted from the LED.

Moreover, the controller 70 includes a dummy-signal generator 18, a signal discriminator circuit 29, and a motor controller 31. The dummy-signal generator 18 generates a dummy signal based on the binary signal when the marks 5*a* on the scale 5 are detected to be at the predetermined distance by the sensor 6. A signal from the signal discriminator circuit 29 is input to the motor controller 31.

The motor controller 31 controls the driving of a belt-driving motor 7.

The intermediate transfer unit 20 shown in FIG. 2 is included in an imaging section of a color copy machine (described later by referring to FIG. 27), which is a tandem electrophotography apparatus. The intermediate transfer unit 20 includes four photosensitive drums 40B, 40Y, 40M, and 40C (referred to as 40 when not specified), a writing unit 21, and the intermediate transfer belt 10. The four photosensitive drums hold toner images of different colors respectively and rotate. The writing unit 21 is an image writing unit that writes image of a corresponding color on each of the photosensitive drums 40 and irradiates light at timing of emission according to a distance between each of the photosensitive drums. The intermediate transfer belt 10 rotates such that the toner image of each color formed on the photosensitive drums 40 is transferred one after another, to be superimposed.

The intermediate transfer belt 10 is an endless belt and is stretched rotatably over a driving roller 9, and driven rollers 15 and 16 to rotate in a direction of an arrow mark C. A cleaning unit 17 that is disposed between the driven rollers 15 and 16 removes toner remained on a surface of the intermediate transfer belt 10 after the image is transferred.

The photosensitive drums 40Y, 40C, 40M, and 40K form the four image forming sections for yellow, cyan, magenta, and black colors and images of each of these colors are formed on the photosensitive drums. The photosensitive drums 40Y, 40C, 40M, and 40K are disposed in positions above a straight line portion of the intermediate transfer belt 10 stretched between the driving roller 9 and the driven roller 15 and rotate in an anticlockwise direction shown in FIG. 2. The images formed (toner images) on the photosensitive drums are transferred one after another to be superimposed directly on an outer surface of the intermediate transfer belt 10.

A charging unit, a developing unit, a photosensitive-drum cleaning unit, and a decharging unit (not shown in FIG. 2 since these are widely known units) are disposed around the photosensitive drums 40 and a transfer roller 62 is disposed in a primary transfer position of each of the photosensitive drums 40. The writing unit 21 is disposed above the photosensitive drums 40.

The writing unit 21 includes four laser diodes for forming images of four different colors. Light (laser beam) is irradiated from each of the laser diodes to each of the photosensitive drums 40 and digital image data is written on the photosensitive drums 40.

On the other hand, a secondary transfer unit 22 is disposed beneath the intermediate transfer belt 10. The secondary transfer unit 22 transfers an image on the intermediate transfer belt 10 to a sheet P, which is a transfer material. The secondary transfer unit 22 includes a secondary transfer belt 24, which is an endless belt stretched over two rollers 23 and 23. The secondary transfer belt 24 presses against the driven roller 16 through the intermediate transfer belt 10.

The secondary transfer unit 22 transfers collectively the toner images on the intermediate transfer belt 10 to the sheet P, which is fed between the secondary transfer belt 24 and the intermediate transfer belt 10.

Moreover, the secondary transfer unit 22 performs a function of carrying the sheet P upon the image transfer, to a fixing unit (not shown in the diagram). The secondary transfer unit 22 may also be a transfer unit that uses a transfer roller and a non-contact charger.

At the time of image formation, the intermediate transfer belt 10 in the intermediate transfer unit 20 starts rotating in the direction of the arrow mark C shown in FIG. 2. At the same time, the photosensitive drums 40Y, 40C, 40M, and 40K start rotating. The writing unit 21 starts writing on a charged surface of each of the photosensitive drums by light corresponding to each of yellow, cyan, magenta, and black colors. Images of different colors formed on the photosensitive drums are transferred one after another to the rotating intermediate transfer belt 10, and superimposed. Thus, a composite full color image is formed.

On the other hand, the sheet P is fed from a paper feeding cassette etc. at a predetermined timing. The sheet P that is fed strikes a registering roller 49 and stops for a time. The sheet P is then carried again with an accurate timing matched with the composite color image on the intermediate transfer belt 10 and fed between the intermediate transfer belt 10 and the secondary transfer unit 22. The secondary transfer unit 22 transfers the color image to the sheet P.

The secondary transfer unit 22, which also functions as a carrying unit carries the sheet P with the image transferred on it to the fixing unit, which is not shown. In the fixing unit the transferred image is fixed by heat and pressure.

The intermediate transfer belt 10 is driven and rotated in the direction of the arrow C in FIG. 2 by a belt driving motor 7 via the driving roller 9. In other words, torque of the belt driving motor 7 is transmitted to the driving roller 9 that stretches the intermediate transfer belt 10 rotatably as well as drives the intermediate transfer belt 10. The rotating of the driving roller 9 rotates the intermediate transfer belt 10 in the direction of the arrow mark C.

An arrangement may be made such that the belt driving motor 7 transmits the torque directly to the driving roller 9 or the transmission may be via a reduction gear 41 disposed between the belt driving motor 7 and the driving roller 9 as shown in FIG. 3.

The intermediate transfer belt 10 includes a material such as a fluorine based resin, a polycarbonate resin, and a polyimide resin and an elastic belt that has all layers or some of the layers formed by an elastic material.

The controller 70, which is shown in FIG. 2, changes a control of speed of the intermediate transfer belt to a dummy-signal control, which is different from the normal control. The controller 70 changes the control when a defective portion in which the marks 5*a* on the scale 5 are not detected to be at the predetermined interval, based on a change in the binary signal that is output by the sensor 6.

When the defective portion is not detected, the controller 70 controls the intermediate transfer belt to a suitable speed by a feed-back control that uses information from the scale 5.

The feed-back control of the speed by the controller 70 is performed by adjusting speed of rotation (rpm) of the belt driving motor 7. In the speed control, the sensor 6 that is disposed near the intermediate transfer belt 10 detects a plurality of scales 5, which are provided along the direction of movement throughout the circumference of the intermediate transfer belt 10. Actual speed of the intermediate transfer belt 10 is detected from a timing of reading of each of the scales 5. Based on the actual speed, the toner images from the four photosensitive drums 40 are allowed to be superimposed on the intermediate transfer belt 10. The speed control is performed in this manner.

Figure 4:
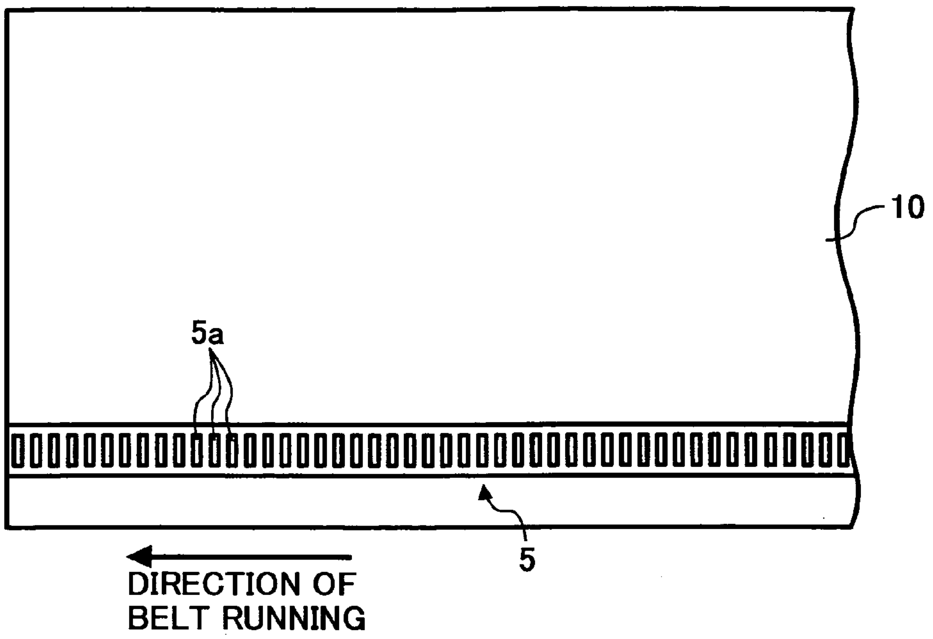
FIG. 4 is a top view of the intermediate transfer belt according to the embodiment A1.

The scale 5, as shown in FIGS. 3 and 4, includes marks 5*a* disposed on one edge of an inner surface (or may be on the outer surface) of the intermediate transfer belt 10 continuously at same interval (predetermined interval) in the direction of movement of the intermediate transfer belt 10, throughout the circumference of the belt.

Figure 5:
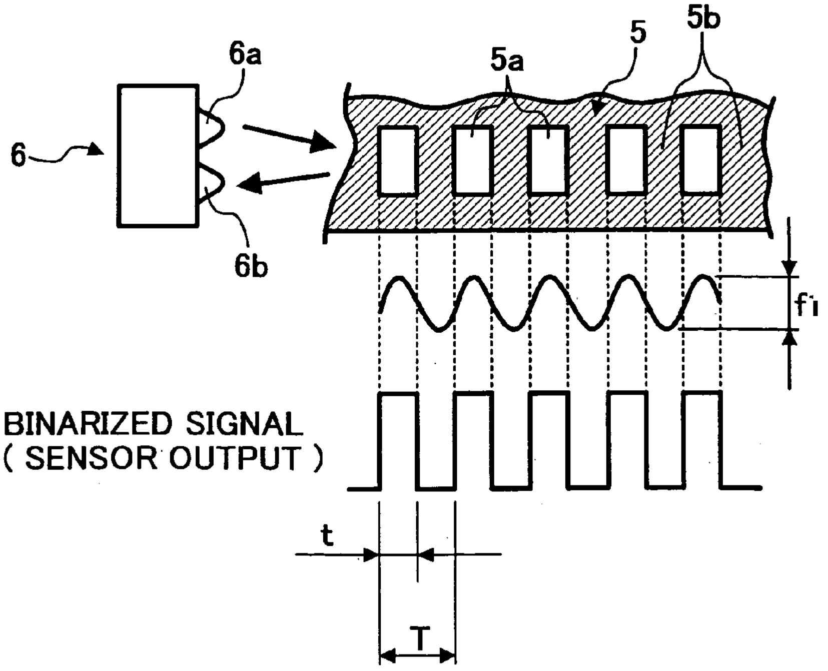
FIG. 5 is a schematic of a sensor that detects a scale provided on the intermediate transfer belt and a sensor output according to the embodiment A1.

The marks 5*a*, as shown in FIG. 5 are white in color and a non-reflecting portion 5*b* between the marks 5*a* is black (shown by hatching) in color. A position of the scale 5 in a direction of the width of the belt (main scanning direction) is a position opposite to an edge portion of the photosensitive drum as shown in FIGS. 3 and 4.

According to the embodiment A1, the sensor 6 that detects the scale 5 is disposed between the driving roller 9 and the driven roller 15 as shown in FIG. 3. However, the sensor 6 may be disposed in any other position that enables to detect the scale 5 on the portion of the surface of the intermediate transfer belt 10 that is stretched in a straight line.

The sensor 6, as shown in an example in FIG. 5 may be a reflecting optical sensor that includes a pair of a light emitting section 6*a* and a light receiving section 6*b* each. Light reflected from the scale 5 upon irradiation from the light emitting section 6*a* is received at the light receiving section and amounts of light reflected from the mark 5*a* on the scale and the non-reflecting portion 5*b*, which are different, are detected.

Figure 6:
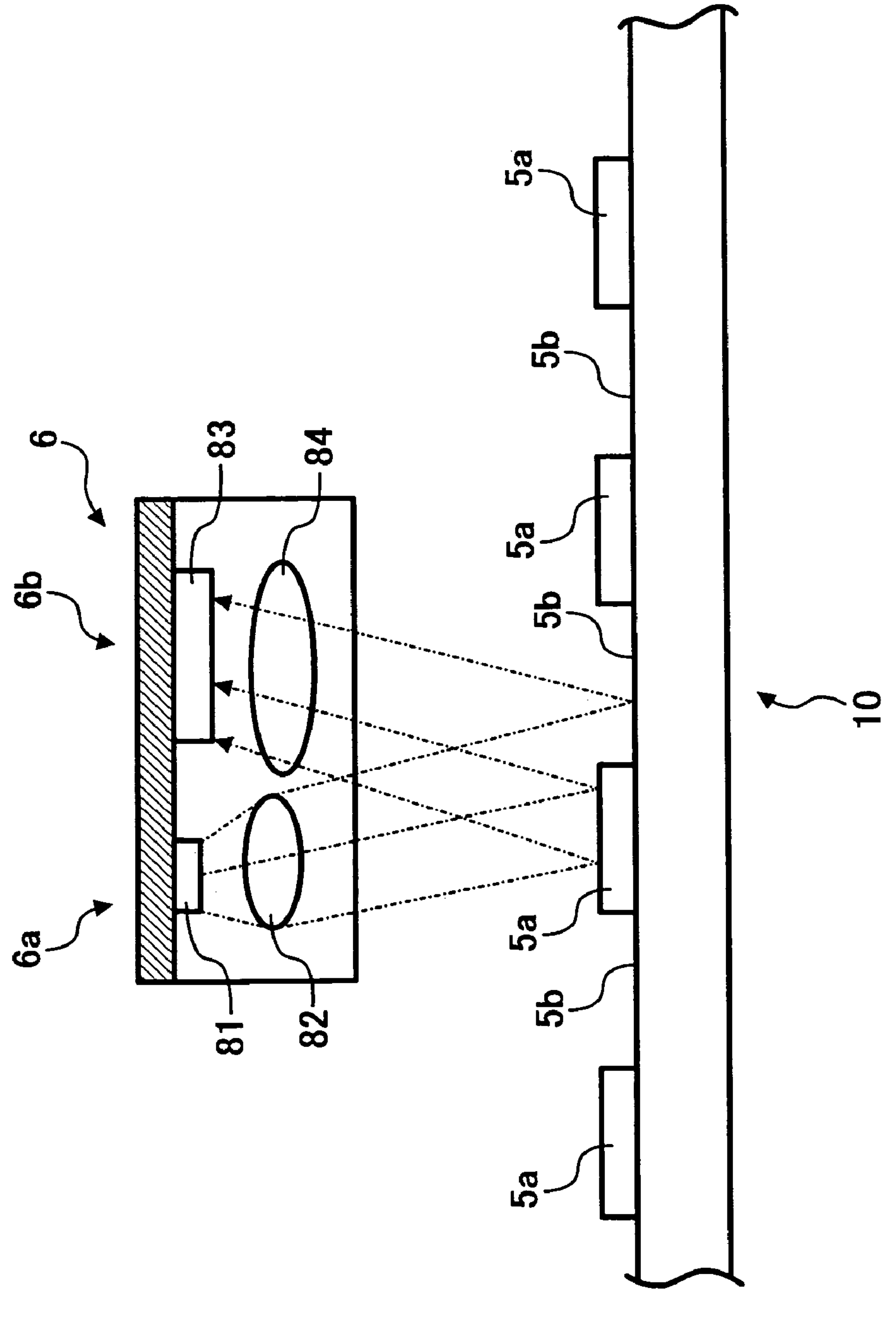
FIG. 6 is a schematic for illustrating a detail of the sensor according to the embodiment A1.

FIG. 6 is a schematic diagram illustrating the sensor 6 in detail. The sensor 6 includes a light source 81, which is an LED and a lens 82 on a light-emission side in the light emitting section 6*a*, and a photo detector 83 and a lens 84 on a light-receiving side in the light receiving section 6*b* respectively.

The sensor 6 acquires an analog alternating signal of a continuously modulated sign wave from a reflectivity that is different at the non-reflecting portion 5*b* and the mark 5*a* of the scale 5 as shown in FIG. 5. After the analog alternating signal is converted to a digital signal by a circuit in the sensor, the sensor 6 changes the signal to a binary signal of High and Low and the light receiving section 6*b* outputs the binary signal.

According to the embodiment A1, the sensor 6 is of a type that outputs a High signal when the light receiving section 6*b* receives light. Therefore, since the reflectivity of the mark 5*a* on the scale 5 is greater than that of the non-reflecting portion, a range of t in FIG. 5 for the signal that is output from the sensor 6 is an output during the time when the mark 5*a* passes the sensor 6.

Therefore, with the rotation of the intermediate transfer belt 10, according to the presence or absence of the mark 5*a* that passes through a detection range of the sensor 6, the output of the sensor 6 is repeated as High and Low as shown in the diagram.

From the repeated High and Low outputs, by calculating time T from a point of time where the signal changes from Low to High to a point of time where the signal changes subsequently from Low to High, the traveling speed of the outer surface of the intermediate transfer belt 10 (hereinafter, "belt speed") can be detected.

Figure 7:
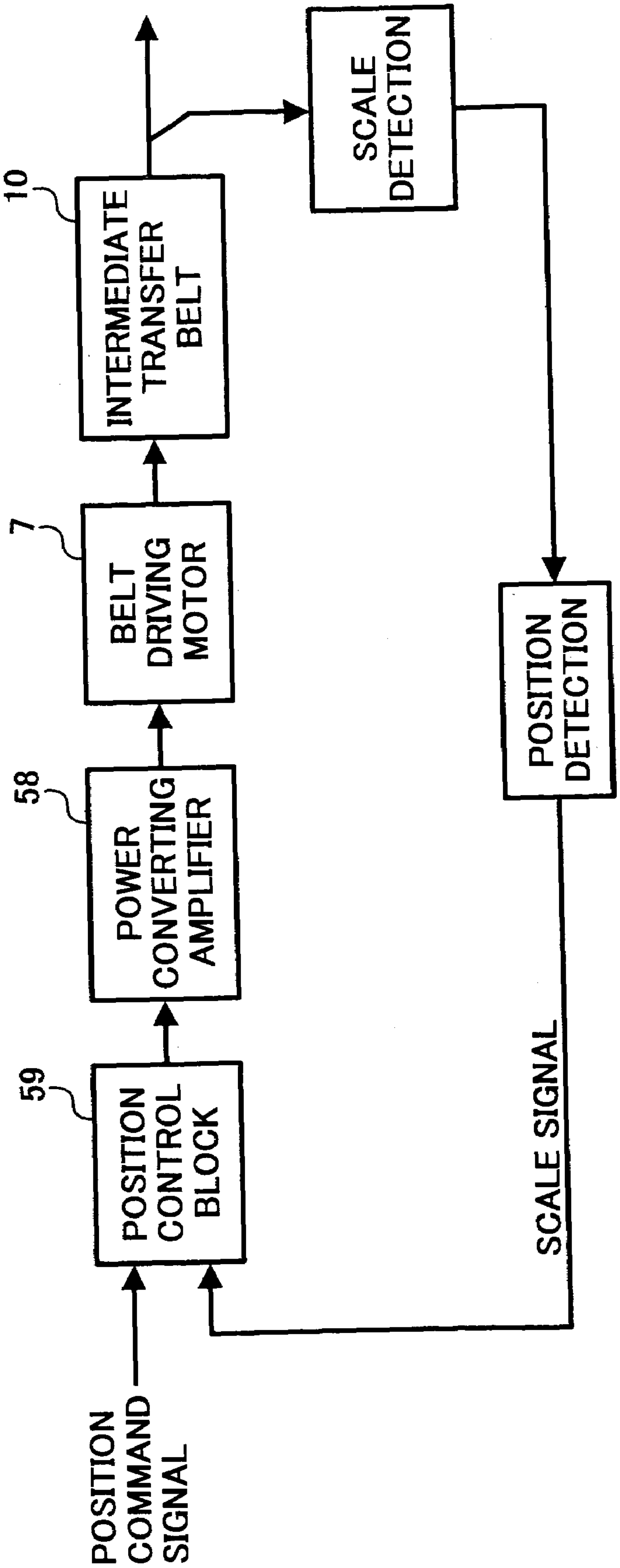
FIG. 7 is a block diagram of an example of a loop that performs a feed-back control of a speed of the intermediate transfer belt by using the scale according to the embodiment A1.

FIG. 7 is a block diagram of an example of a loop that performs the feed-back control of the belt speed of the intermediate transfer belt 10 by using the scale 5.

In this belt-speed control, a position command signal formed by a continuous pulse of the same time interval and a scale signal of a position detection that is acquired by detecting the scale 5 on the intermediate transfer belt are fed back. The scale signal of the position detection and the position command signal are compared in a position control block 59 and an amount of deviation is measured.

The amount of deviation is converted to electric power by the power converter amplifier 58 and the rpm of the belt driving motor 7 is controlled to correct the amount of deviation. By doing so, the control is performed so that the speed of the intermediate transfer belt 10 follows correctly the position command signal, thereby controlling the belt speed at an accurate speed.

Thus, by detection of the scale 5 by the sensor 6, an actual traveling speed of the surface of the intermediate transfer belt 10 is detected from information that is output corresponding to the belt speed. The control is performed such that the traveling speed of the intermediate transfer belt 10 becomes a basic speed that is set in advance by the controller 70 in FIG. 2.

The controller 70 has a microcomputer that includes a central processing unit (CPU), a read only memory (ROM), a random access memory (ROM), and an input-output circuit (I/O). The CPU has various judging and processing functions. The ROM stores fixed data and computer programs for various processes. RAM is a data memory that stores process data.

However, on the elastic belt, it is difficult to provide marks accurately at constant interval throughout the circumference.

Figure 8:
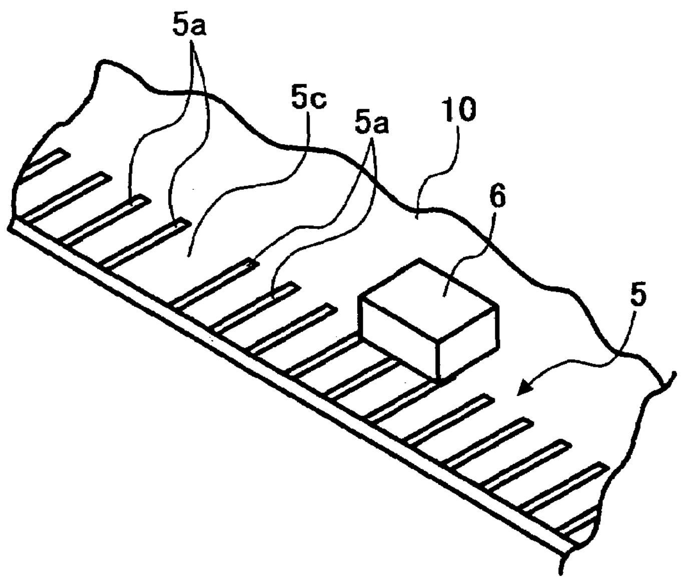
FIG. 8 is a perspective view of a breakage developed at a joint of the scale that is provided on the intermediate transfer belt according to the embodiment A1.

Due to a process of manufacturing of the belt and a circumferential tolerance, as shown on the intermediate transfer belt 10 in FIG. 8, at a joint portion of the circumference of the scale 5 the marks 5*a* are not at the constant interval, thereby developing a breakage 5*c*.

Figure 9:
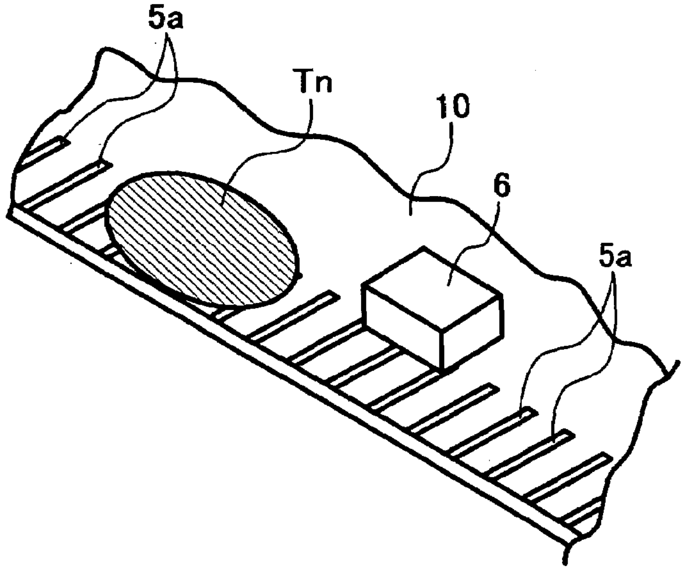
FIG. 9 is a perspective view for illustrating a lump of toner dropped on the scale on the intermediate transfer belt according to the embodiment A1.

Or, as shown in FIG. 9, even if marks 5*a* are at constant interval, if a lump of toner Tn is dropped on the marks, the marks 5*a* are contaminated and the contaminated portion cannot be detected. Inability to detect the marks due to the contamination by the toner is particularly after elapsing of time. Moreover, if a portion of the marks 5*a* is damaged or scraped, that particular portion is degraded and cannot be detected correctly.

Therefore, in such a case, in a defect where the marks 5*a* cannot be detected at correct constant interval (predetermined interval), a normal binary signal that has to be output at a constant interval of time t from the sensor 6 as shown in FIG. 5 is not output. Due to this, the belt speed control by using the feed-back loop as described by referring to FIG. 7 cannot be performed.

This being the case, when such a defect is detected, the intermediate transfer unit 20 changes the speed control of the intermediate transfer belt 10 from the normal control (control by using the feed-back loop) to the dummy-signal control.

In the dummy-signal control, the dummy-signal generator 18 shown in FIG. 1 generates a dummy signal that includes a signal pulse similar to the binary signal, which is output when the sensor 6 detects a continuous portion of the marks 5*a* at normal constant interval. When the sensor 6 detects the defective portion of marks 5*a*, the signal discriminator circuit 29 outputs the dummy signal to the motor controller 31 and the speed control of the intermediate transfer belt is performed.

Thus, even if there is a defect in the marks 5*a*, the intermediate transfer unit 20 performs the speed control of the intermediate transfer belt 10 by the dummy-signal control (alternate control) during the detection of the defect by the sensor 6. Therefore, the intermediate transfer belt 10 cannot go out of the speed control.

However, the dummy-signal control is performed based on the dummy signal that substitutes the defective portion of the undetectable marks 5*a* and the belt speed is not controlled directly by a signal that is acquired from normal marks 5*a*, which lie in the defective portion. Therefore, such a control is less accurate as compared to the control by the binary signal in the feed-back control in which factors such as stretching of belt are also taken into consideration.

For this reason, if a proportion of defective portion on the marks 5*a* on the scale 5 increases with the elapsing of time, the frequency of changing the control of the intermediate transfer belt 10 to the control by the dummy signal increases. With the increase in the frequency of changing the control, the accuracy of the control of the belt speed decreases.

This being the case, the intermediate transfer unit 20 according to the embodiment A1 is provided with the counter 12 that counts the wave number of the binary signal, which is output from the sensor 6, the memory 13 that stores the wave number n of the binary signal that is output when the sensor 6 detects the normal scale 5 during the predetermined time $t_1$, which is set voluntarily, and the arithmetic circuit 14 that calculates the difference between the wave number n, which is stored in the memory 13 and the wave number $n_1$, which is counted by the counter 12 during the time interval same as the predetermined time $t_1$.

When the difference between the wave number $n_1$ and the wave number n that is counted by the arithmetic circuit 14 becomes greater than the predetermine value, the mark-detection judging section 11 judges the scale 5 to be defective. The mark-detection judging section 11 controls to display warnings such as an indication of degradation of the scale 5 and the change in the speed control of the intermediate transfer belt 10 to the dummy-signal control.

Therefore, the predetermined value for judging the defect is set while making it sure experimentally that a shift in the color image is within an acceptable range of compromise. By setting the predetermined value in this manner, proportion of occurrence of breakage due to the lack of the marks 5*a* and contamination as well as damage on the marks 5*a* of the scale 5 provided on the intermediate transfer belt 10 can be monitored. When the proportion becomes greater than a predetermined value after elapsing of time, it can be verified from the outside of the apparatus, thereby enabling to prevent the formation of an image with a color shift.

Thus, the intermediate transfer unit 20 causes the memory 13 to store the wave number n of the binary signal that is output when the sensor 6 detects the normal portion of the scale 5 during the predetermined time $t_1$, which is set voluntarily, and the counter 12 to count the wave number $n_1$ of the binary signal during the time interval same as the predetermined time $t_1$. The intermediate transfer unit 20 then calculates the difference between the counted value ($n_1$) and the wave number n stored in the memory 13. If the difference between the wave numbers is greater than the predetermined value, the intermediate transfer unit 20 judges the scale 5 to be defective and displays the warning indicating that the scale 5 is degraded and the speed control (or the position control) of the intermediate transfer belt 10 is changed to the control different from the normal control. Thus, the intermediate transfer unit 20 executes a method of degradation process of the endless moving-member.

A wave number set during the initial setting at the time of shipment from the factory is used and there is a possibility of damage (being scratched) and contamination being deposited on the intermediate transfer belt 10 during the shipment of the image forming apparatus. Taking this into consideration, for storing the wave number n in the memory 13, it is desirable that when the user operates the image forming apparatus upon installation for the first time, the intermediate transfer belt 10 is rotated to make one revolution and a wave number is acquired. The acquired wave number is let to be initial data. By doing so, it is possible to perform the control more accurately.

Figure 10:
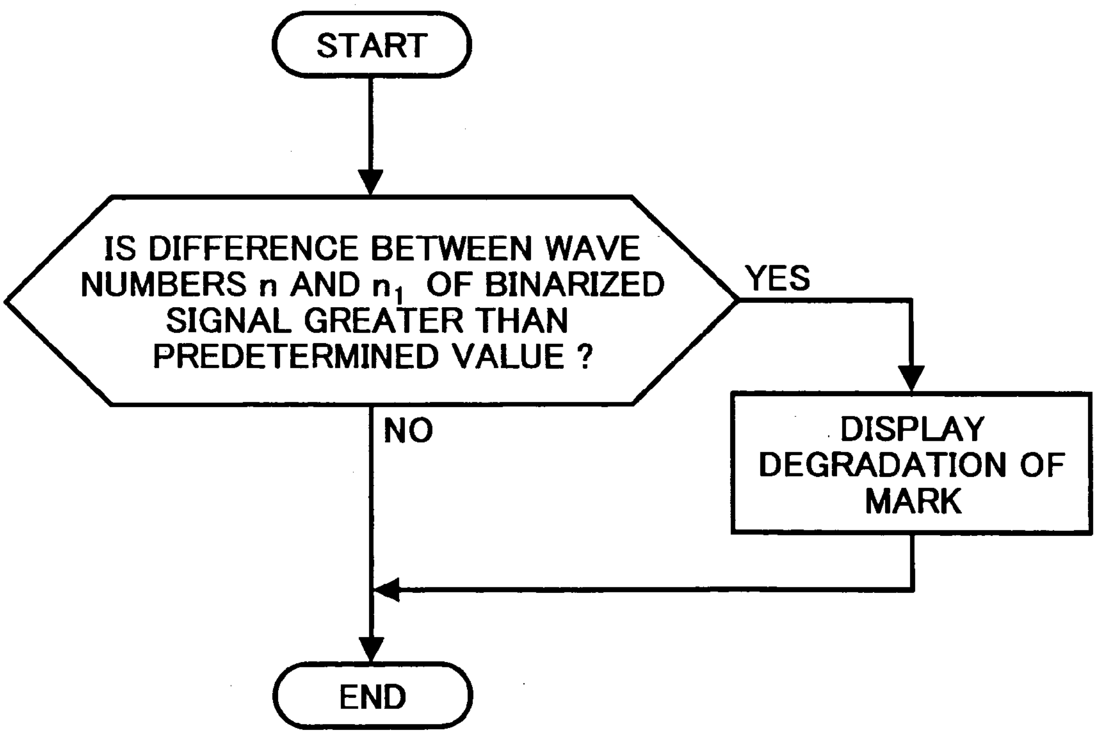
FIG. 10 is a flowchart of a process procedure for monitoring degradation of the marks on the intermediate transfer belt by the control system of the intermediate transfer unit according to the embodiment A1.

FIG. 10 is a flowchart of a routine of monitoring degradation of the marks on the intermediate transfer belt by a control system of the intermediate transfer unit 20.

As the routine in FIG. 10 starts, a judgment of whether the difference between the wave numbers $n_1$ and n of the binary signal has become greater than the predetermined value is made. If the difference between the wave numbers $n_1$ and n is not greater than the predetermined value, since the marks 5*a* on the scale 5 are not degraded to an extent to be judged to be defective, the process is ended.

If the difference between n and $n_1$ is greater than the predetermined value (judged to be defective—Y), the marks 5*a* on the scale 5 are degraded to an extent to be judged to be defective. Therefore, the warnings indicating the degradation of the marks 5*a* and that the speed control of the intermediate transfer belt 10 is changed to the dummy-signal control are displayed on the display 8 (omitted in the diagram) and the process is ended.

The predetermined time $t_1$ (same as the predetermined time $t_1$ at which the wave number n of the binary signal that is output when the sensor 6 detects the normal scale 5, to be stored in the memory 13) at which the counter 12 counts the wave number $n_1$ of the binary signal output by the sensor 6 can be set voluntarily.

If the predetermined time $t_1$ is set to be shorter than the time taken for one revolution of the intermediate transfer belt 10, degradation with elapsing of time in a partial area of the scale 5 on the intermediate transfer belt 10 can be detected.

Figure 11:
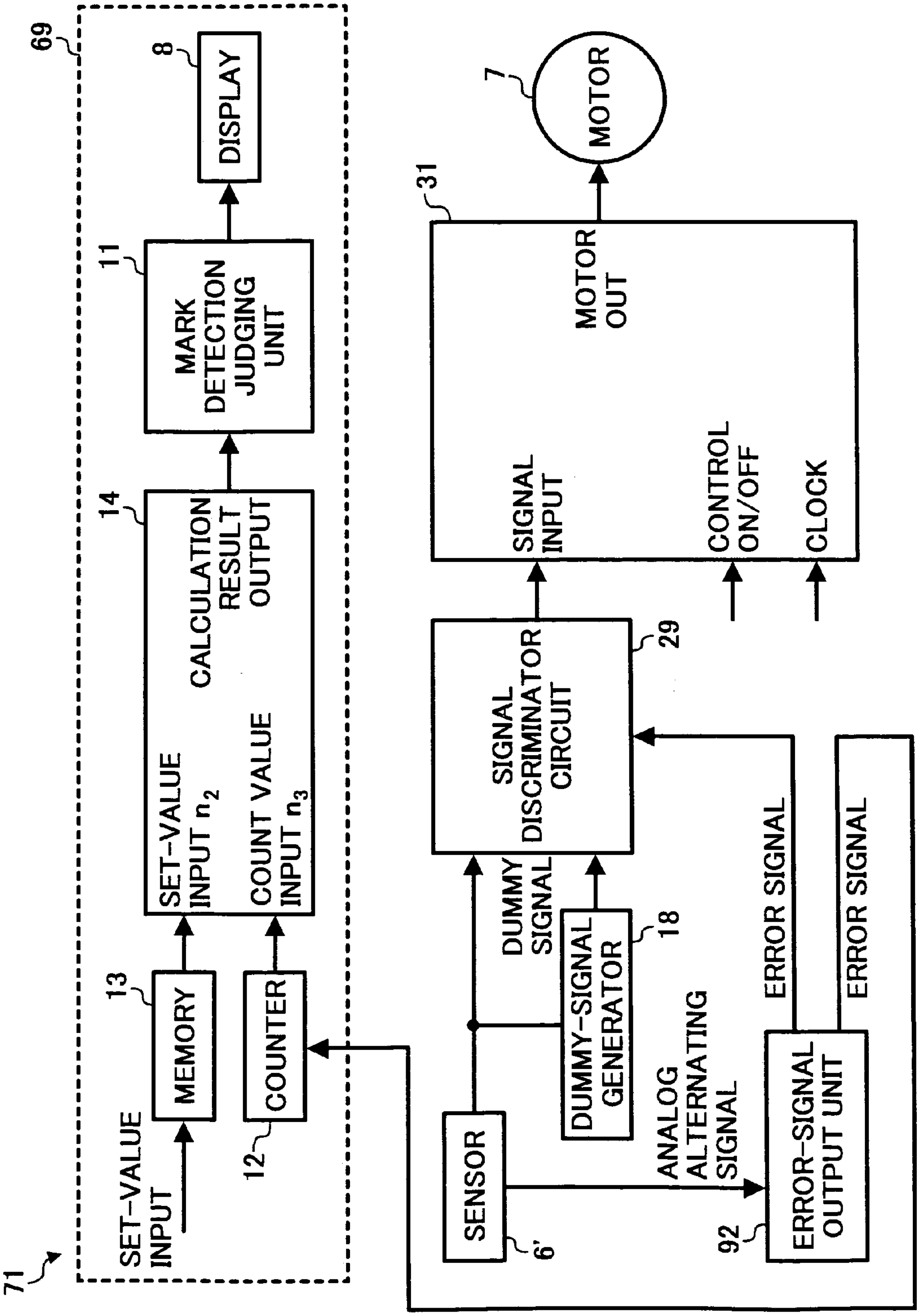
FIG. 11 is block diagram of an intermediate transfer unit as an example of an endless-moving-member driving unit according to an embodiment A2 of the present invention.

FIG. 11 is a block diagram similar to FIG. 1, of an intermediate transfer unit, which is the endless-moving-member driving unit according to an embodiment A2. Same reference numerals are used for elements identical with those in FIG. 1.

The intermediate transfer unit according to the embodiment A2 has a structure of mechanisms similar to that of the intermediate transfer unit 20 according to the embodiment A1 described by referring to FIGS. 1 to 10 except for a scale 5', and a sensor 6' that detects the scale 5', which differ from the scale 5 and the sensor 6 in the intermediate transfer unit 20. Apart from this, a control of the belt speed in the intermediate transfer unit according to the embodiment A2 differs from that of the intermediate transfer unit 20 according to the embodiment A1. Hence, the diagrammatic indication and the detailed description of the mechanisms of the intermediate transfer unit are omitted. Reference numerals used in FIG. 2 are used in a description wherever necessary.

Figure 12:
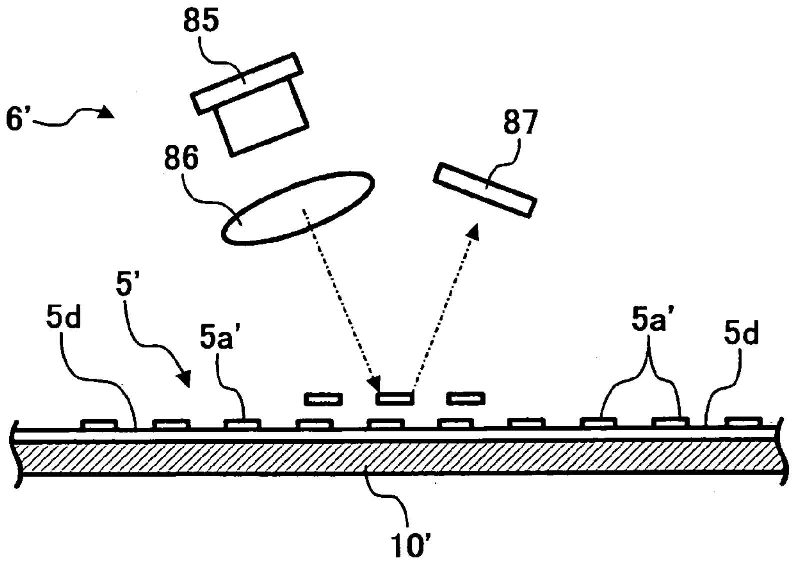
FIG. 12 is a schematic of a sensor used in the embodiment A2 along with the intermediate transfer belt.

The intermediate transfer unit according to the embodiment A2 includes an intermediate transfer belt 10' and the sensor 6' (FIGS. 11 and 12). The intermediate transfer belt 10' is similar to the intermediate transfer belt described in FIG. 2 and is provided with a scale 5' shown in FIG. 13 along the circumference of the belt. The sensor 6' detects the scale 5' on the intermediate transfer belt 10' and outputs an analog alternating signal that is modulated continuously. A controller 71 detects a defective portion in which marks 5a' on the scale 5' are not detected to be at the constant interval, based on a change in an output level of the analog alternating signal output by the sensor 6'. Upon detection of the defective portion, as shown in FIG. 11, the controller 71 changes the speed control (or the position control) of the intermediate transfer belt 10' to a control (dummy-signal control), which is different from the normal control.

The controller 71 includes an error-signal outputting section 92, the counter 12, and the memory 13. The error-signal outputting section 92 is an error-signal outputting unit that outputs an error signal (described in detail by referring to FIG. 14) when the defective portion is detected based on the change in the output level of the analog alternating signal. The counter 12 counts a wave number of an error signal that is output by the error-signal outputting section 92. The memory 13 stores a wave number $n_2$ of the error signal that is output from the error-signal outputting section 92 when the sensor 6' detects a normal portion (area without any defect) of the marks 5a' of the scale 5' during the predetermined time $t_1$, which is set voluntarily.

Moreover, the controller 71 includes a mark-degradation monitoring system 69. The mark-degradation monitoring system 69 includes the arithmetic circuit 14 and the mark-detection judging section 11. The arithmetic circuit 14 is a calculating unit that calculates a difference between the wave number $n_2$ of the error signal when the normal portion of the scale 5' is detected, which is stored in the memory 13 and a wave number $n_3$ (since area counted is optional, sometimes, the defective portion is included in the area) of the error signal that is counted by the counter 12 during a time interval same as the predetermined time $t_1$. The mark-detection judging section 11 functions as a warning display unit that controls to display warnings on the display 8, which is disposed at a position visible from outside. The warnings displayed on the display 8 include warnings such as an indication of degradation of the scale 5' when the scale 5' is judged to be defective. The mark-detection judging section 11 judges the scale 5' to be defective when the difference between the wave numbers $n_2$ and $n_3$ calculated by the arithmetic circuit 14 becomes greater than the predetermined value and causes the display of the indication of the degradation of the scale 5'.

Figure 13:
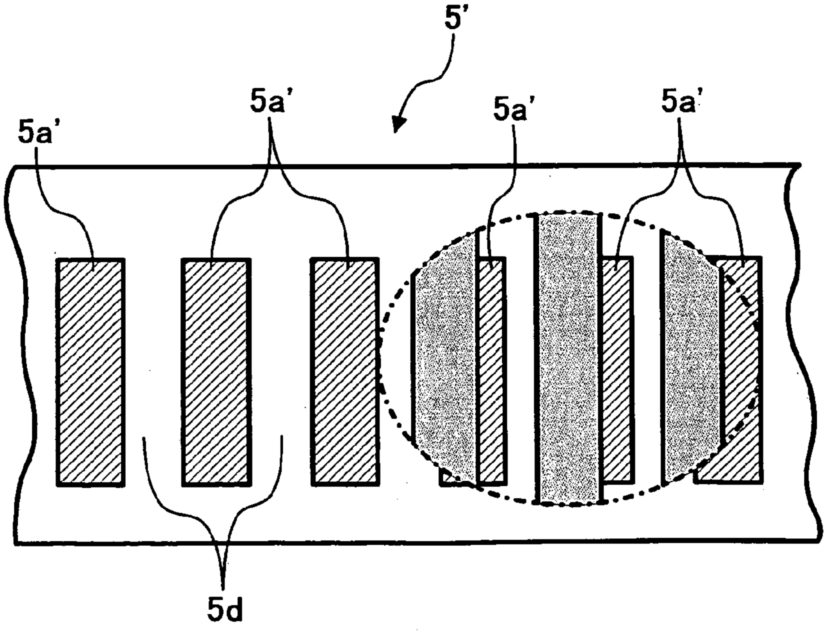
FIG. 13 is a schematic for illustrating a beam from a sensor that reads a plurality of slit patterns simultaneously according to the embodiment A2.

The sensor 6' used according to the embodiment A2 is a reflecting optical sensor that uses a plurality of slits as shown in FIG. 12. In this sensor, light irradiated from a light source 85 is allowed to pass through a lens 86 and incident on the scale 5'. Light reflected from the scale 5' is received by a light receiver 87. FIG. 13 is an illustration of an example of a beam from the sensor 6' that reads a plurality of slit patterns simultaneously.

The scale 5' on the intermediate transfer belt 10' includes marks 5a' through which light is transmitted and a portion 5d between and around the marks 5a', which is a light reflecting portion.

Figure 14:
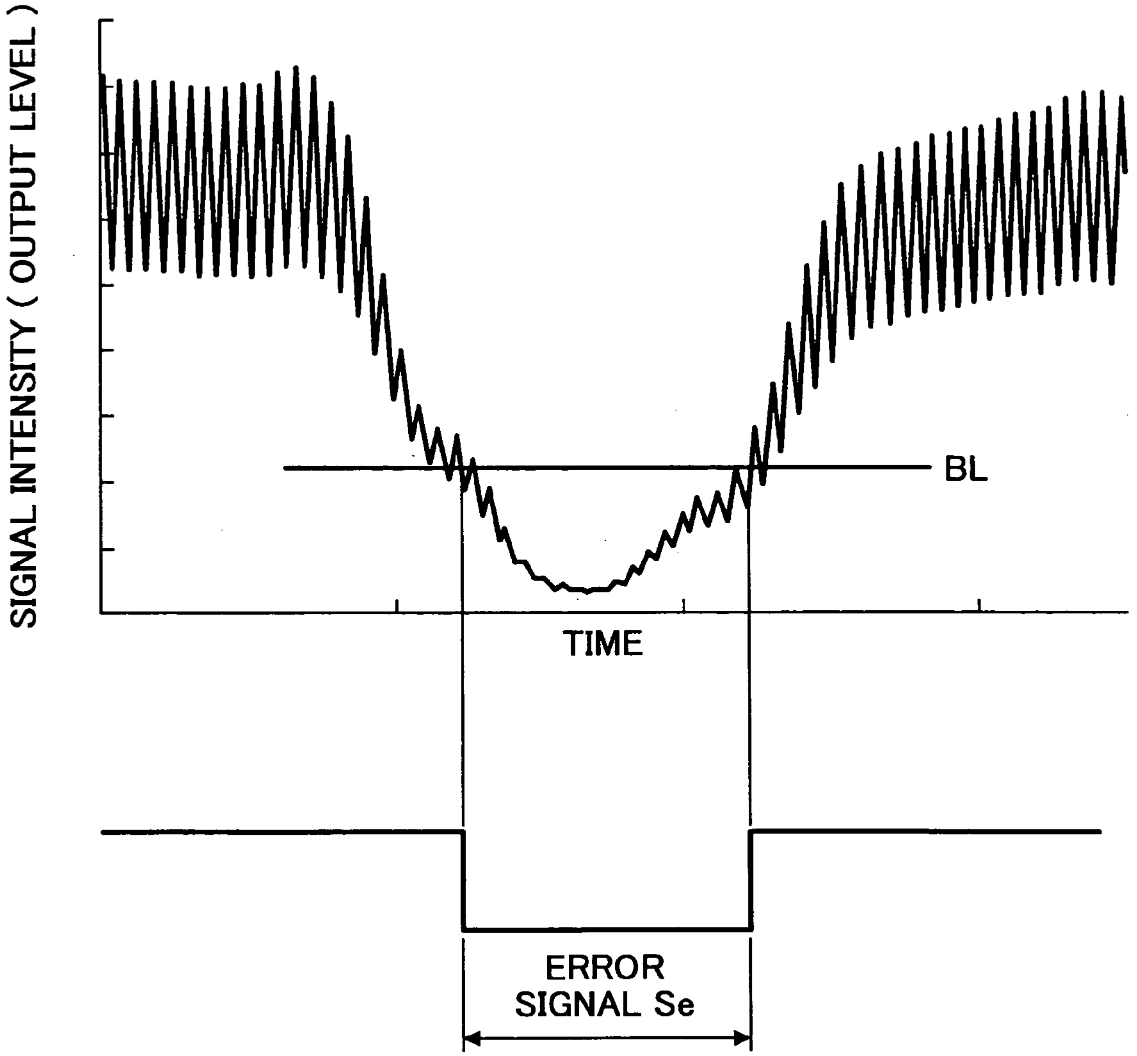
FIG. 14 is a waveform of an analog alternating signal when a defective portion on the scale is detected by the sensor according to the embodiment A2.

FIG. 14 is an example of an analog alternating signal when a portion around the defective portions (a portion where the marks are discontinuous) in which the marks 5a' on the scale 5a are not detected by the sensor 6' that reads the slits simultaneously.

As shown in FIG. 14, since an output level of the analog alternating signal changes substantially, when the portion where the marks 5a' are discontinuous, an error signal Se corresponding to the discontinuous portion can be acquired by comparing relative magnitude correlation by a comparator by providing a threshold value BL.

A portion where the output level of the analog alternating signal changes substantially is not only a joint in the circumferential direction of the scale 5' (see breakage 5c of the marks in FIG. 8), but also a portion of the scale contaminated by the toner as described by referring to FIG. 9. When there is damage on the scale 5', in such a case also there is a substantial change in the output level of the analog alternating signal (drop in the signal strength).

Therefore, at portions where the output level of the analog alternating signal changes substantially, the error signal Se shown in FIG. 14 is output from the error-signal outputting section 92 shown in FIG. 11.

The control is performed based on the error signal Se.

Figure 15:
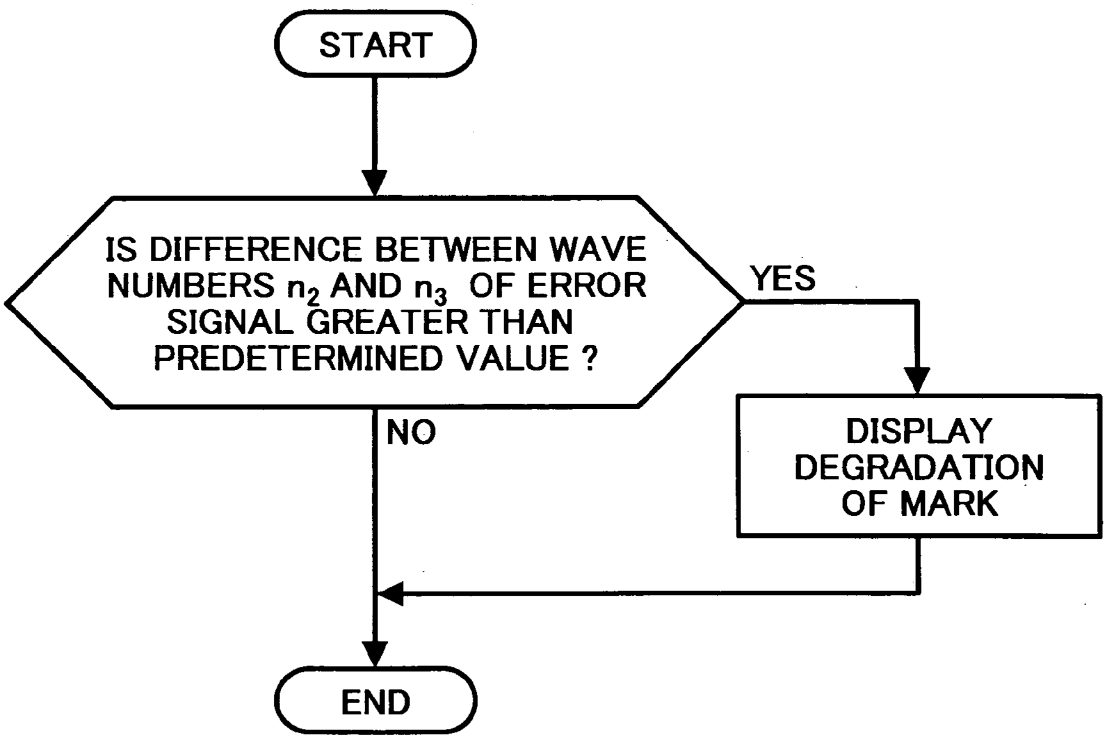
FIG. 15 is a flowchart of a process procedure for monitoring degradation of the marks on the intermediate transfer belt by the control system of the intermediate transfer unit according to the embodiment A2.

In other words, the controller 71 shown in FIG. 11 starts the routine of the mark-degradation monitoring of the intermediate transfer belt shown in FIG. 15 at a predetermined timing.

The controller makes a judgment of whether the difference between the wave numbers $n_2$ and $n_3$ of the error signal is greater than the predetermined value. If the difference between $n_2$ and $n_3$ is not greater than the predetermined value, since the marks 5a' on the slits 5' are not degraded to an extent to be judged to be defective, the process is ended.

If the difference between n2 and n3 is greater than the predetermined value (judged to be defective—Y), the marks 5a' on the slits 5' are degraded to an extent to be judged to be defective. Therefore, the indication of degradation of the marks and that the speed control of the intermediate transfer belt 10' is changed to the dummy-signal control, are displayed (omitted in the diagram) on the display 8 (FIG. 11) and the process is ended.

According to the embodiment A2, the predetermined time $t_1$ of counting the wave number $n_3$ of the error signal can be set voluntarily.

Thus, the intermediate transfer unit according the embodiment A2, causes the memory 13 to store the wave number $n_2$ of the error signal Se that is output, based on the change in the output level of the analog alternating signal when the sensor 6' detects the normal portion of the scale 5' during the predetermined time $t_1$, which is set voluntarily, and the counter 12 to count the wave number $n_3$ of the error signal Se during the time interval same as the predetermined time $t_1$. The intermediate transfer unit then calculates the difference between the counted value ($n_3$) and the wave number $n_2$ stored in the memory 13, of the error signal when the normal portion of the scale 5' is determined. If the difference between the wave numbers is greater than the predetermined value, the scale 5' is degraded and the intermediate transfer unit judges the scale 5' to be defective. The intermediate transfer unit displays the warning indicating that the speed control of the intermediate transfer belt 10' is changed to the control different from the normal control as well as the warning indicating that the scale 5' is degraded. Thus, the intermediate transfer unit executes a method of degradation process of the endless moving-member.

With an increase in the defective portion where the marks 5a' on the scale 5' are not detected to be at the predetermined interval, there is an increase in a part shown in FIG. 14 where the output signal Se is output and the wave number $n_3$ of the error signal goes on increasing. When the wave number $n_3$ of the error signal becomes greater than the predetermined value, the speed control of the intermediate transfer belt 10' is changed to the alternate speed control (dummy-signal control) and the defect in the scale 5' is displayed on the display 8. Therefore, a change in the proportion of the defective portions on the scale 5', which is provided on the intermediate transfer belt 10' can be seen from outside.

The following is a description of an embodiment A2' according to which a defect on the scale provided on the intermediate transfer belt is judged by using an error signal.

The embodiment A2' differs from the embodiment A2 at only one point, which is as follows. According to the embodiment A2', a warning that indicates a change in the speed control of the intermediate transfer belt to a control different from the normal control when the wave number of the error signal, which is counted by the counter becomes greater than a threshold value of the wave number of the error signal, which is set in advance, is displayed. Hence, a diagram is omitted (see FIGS. 11 and 14 if necessary).

In other words, an intermediate transfer unit according to the embodiment A2' includes the error-signal outputting unit and the counter. The error-signal outputting unit outputs an error signal when the scale 5' that is to be detected is not detected to be at the predetermined interval based on a change in the output level of the analog alternating signal similarly as described in the embodiment A2. The counter counts a wave number of the error signal that is output from the error-signal outputting unit. Moreover, according to the embodiment A2', a warning that indicates the change in the speed control (or position control) of the intermediate transfer belt 10' to a control (dummy-signal control) different from the normal control when the wave number of the error signal, which is counted by the counter during the predetermined time that is set voluntarily becomes greater than the threshold value of the wave number of the error signal, which is set in advance, is displayed on the display 8. The mark-detection judging section, which is similar to the mark-detection judging section 11 described in the embodiment A2 by referring to FIG. 11 functions as a warning display unit that displays the warning.

Figure 16:
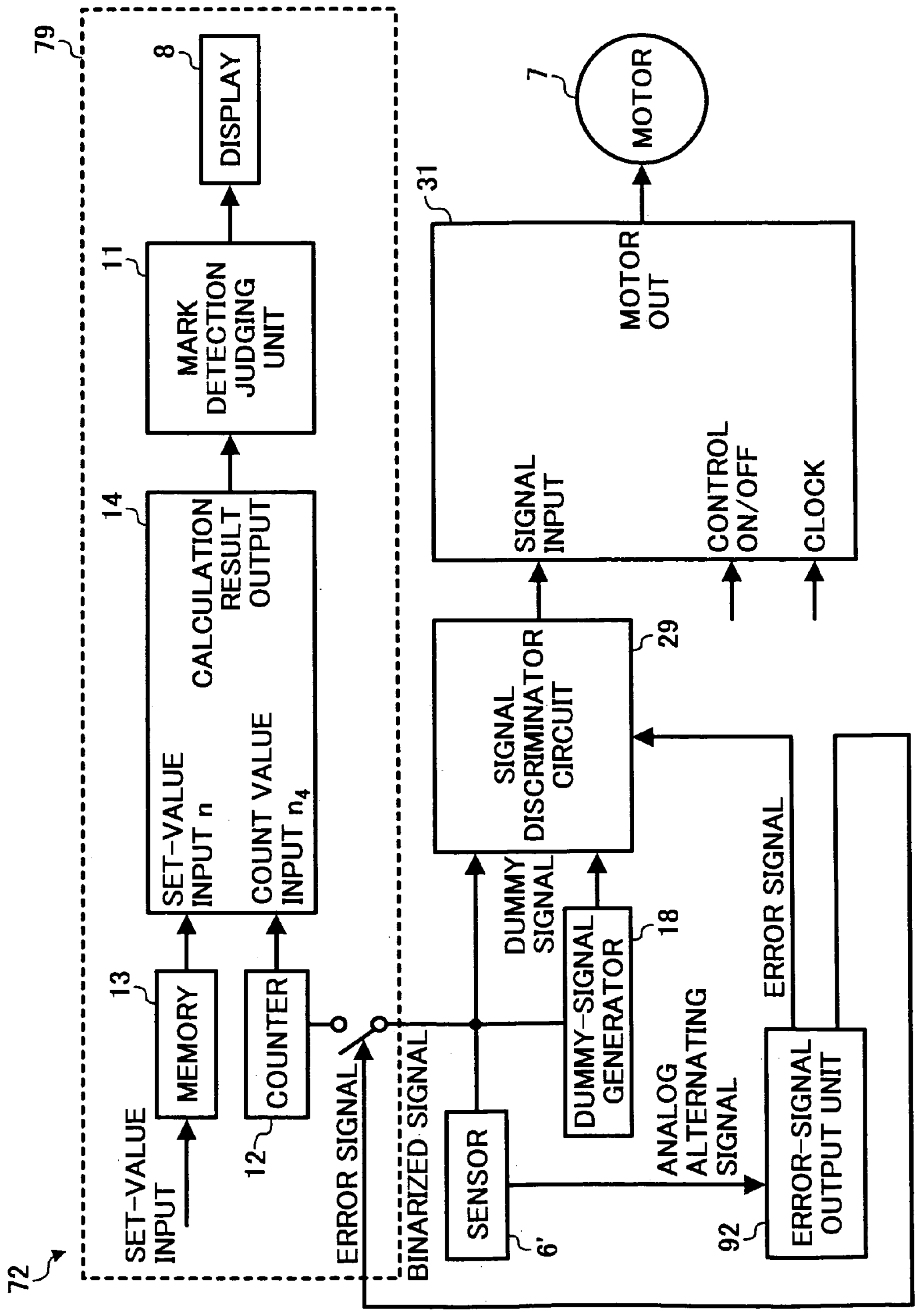
FIG. 16 is a block diagram of an intermediate transfer unit as an example of an endless-moving-member driving unit according to an embodiment A3 of the present invention.
Figure 17:
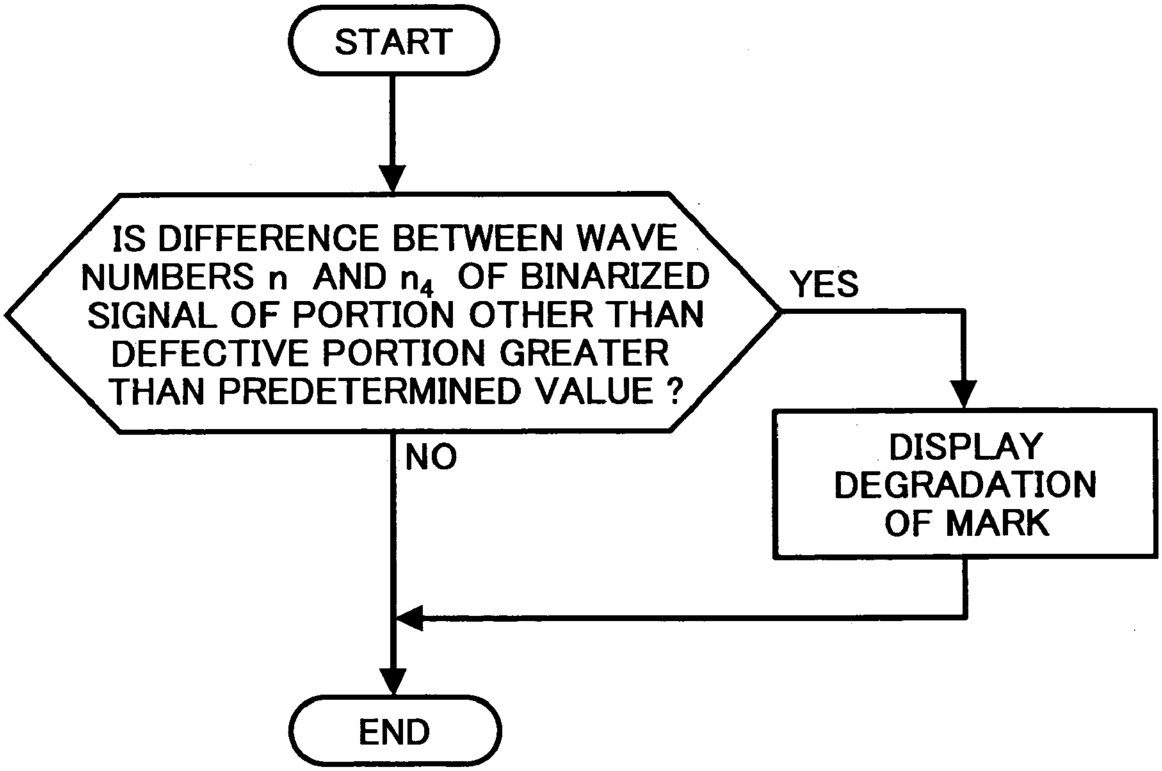
FIG. 17 is a flowchart of a process procedure for monitoring degradation of the marks on the intermediate transfer belt by the control system of the intermediate transfer unit according to the embodiment A3.

FIG. 16 is a block diagram similar to FIG. 1 of the intermediate transfer unit, which is the endless-moving-member driving unit according to an embodiment A3. FIG. 17 is a flowchart of a routine of monitoring degradation of the marks on the intermediate transfer belt by the controls system of the intermediate transfer unit according to the embodiment A3. In FIG. 16, the same reference numerals are used for elements, which are identical with those in FIG. 11.

The intermediate transfer unit according to the embodiment A3 is similar to the intermediate transfer unit 20 according to the embodiment A1 described by referring to FIGS. 1 to 10 except for the scale 5' and the sensor 6' that detects the scale 5', which differ from the scale 5 and the sensor 6 in the intermediate transfer unit 20. Apart from this, the control of the belt speed differs from that according to the embodiment A1. Since the structure of other mechanisms is similar to that of the intermediate transfer unit 20, the diagrammatic indication and detailed description of the mechanisms of the intermediate transfer unit are omitted. Reference numerals used in FIG. 2 are used in a description wherever necessary.

The intermediate transfer unit according to the embodiment A3 includes the intermediate transfer belt 10' and the sensor 6'. The intermediate transfer belt 10' is similar to the intermediate transfer belt described in FIG. 12 and is provided with the scale 5' along the circumference of the belt. The sensor 6' detects the scale 5' on the intermediate transfer belt 10' and outputs the analog alternating signal that is modulated continuously. A controller 72 detects a defective portion in which the marks 5_a_' on the scale 5' (see FIGS. 12 and 13) are not detected to be at the constant interval, based on a change in the signal output by the sensor 6'. Upon detection of the defective portion, the controller 72 changes the speed control (or position control) of the intermediate transfer belt 10' to a control (dummy-signal control), which is different from the normal control.

The controller 72 includes the counter 12, the error-signal outputting section 92, and the memory 13. The counter 12 counts a wave number $n_4$ of a binary signal that is output when the defective portion is not detected by the sensor 6'. The error-signal outputting section 92 is the error-signal outputting unit that outputs an error signal Se when the defective portion is detected, based on a change in the output level of the analog alternating signal. The memory 13 stores a wave number n (a wave number that does not include an area of the defective portion) of the binary signal that is output when the sensor 6' detects the normal marks 5_a_ on the scale 5' during the predetermined time $t_1$ that is set voluntarily, where the error signal Se is not output.

Moreover, the controller 72 includes a mark-degradation monitoring system 79. The mark-degradation monitoring system 79 includes the arithmetic unit 14 and the mark-detection judging section 11. The arithmetic circuit 14 is a calculating unit that calculates a difference between the wave number n, which is stored in the memory 13 and the wave number $n_4$, which is counted by the counter 12 during a time interval same as the predetermined time $t_1$. The mark-detection judging section 11 functions as a warning display unit that controls to display warnings on the display 8, which is disposed at a position visible from outside. The warnings displayed on the display include warnings such as an indication of degradation of the scale 5' when the scale 5' is judged to be defective. The mark-detection judging section 11 judges the scale 5' to be defective when the difference between the wave numbers calculated by the arithmetic circuit 14 becomes greater than the predetermined value and causes the display of the degradation of the scale 5'.

The intermediate transfer unit according to the embodiment A3 being structured in this manner, the control is performed such that when the error signal Se is output, the binary signal from the sensor 6' is not allowed to be input to the counter 12. If the signal in the defective portion is Low, the error signal Se may be allowed to be input to the counter upon applying AND operation with the binary signal.

According to the intermediate transfer unit, as shown in FIG. 17, the wave number $n_4$ of the binary signal output by the sensor 6' in a portion other than the defective portion of the scale 5', or in other words, while the error signal Se is not being output, the wave number $n_4$ is counted by the counter 12. The difference between the wave number $n_4$ and the wave number n of the binary signal, which is a set-value, is calculated. If the calculated value is greater than the predetermined value, the scale 5' is judged to be defective due to degradation. The warnings indicating the degradation of the scale 5' and that the speed control of the intermediate transfer belt 10' is changed to the dummy-signal control are displayed.

Therefore, a change in a proportion of defective portion due to breakage, contamination, and damage of the marks 5_a_' on the scale 5' with the elapsing of time can verified easily by having a look at the display 8 from outside.

Figure 18:
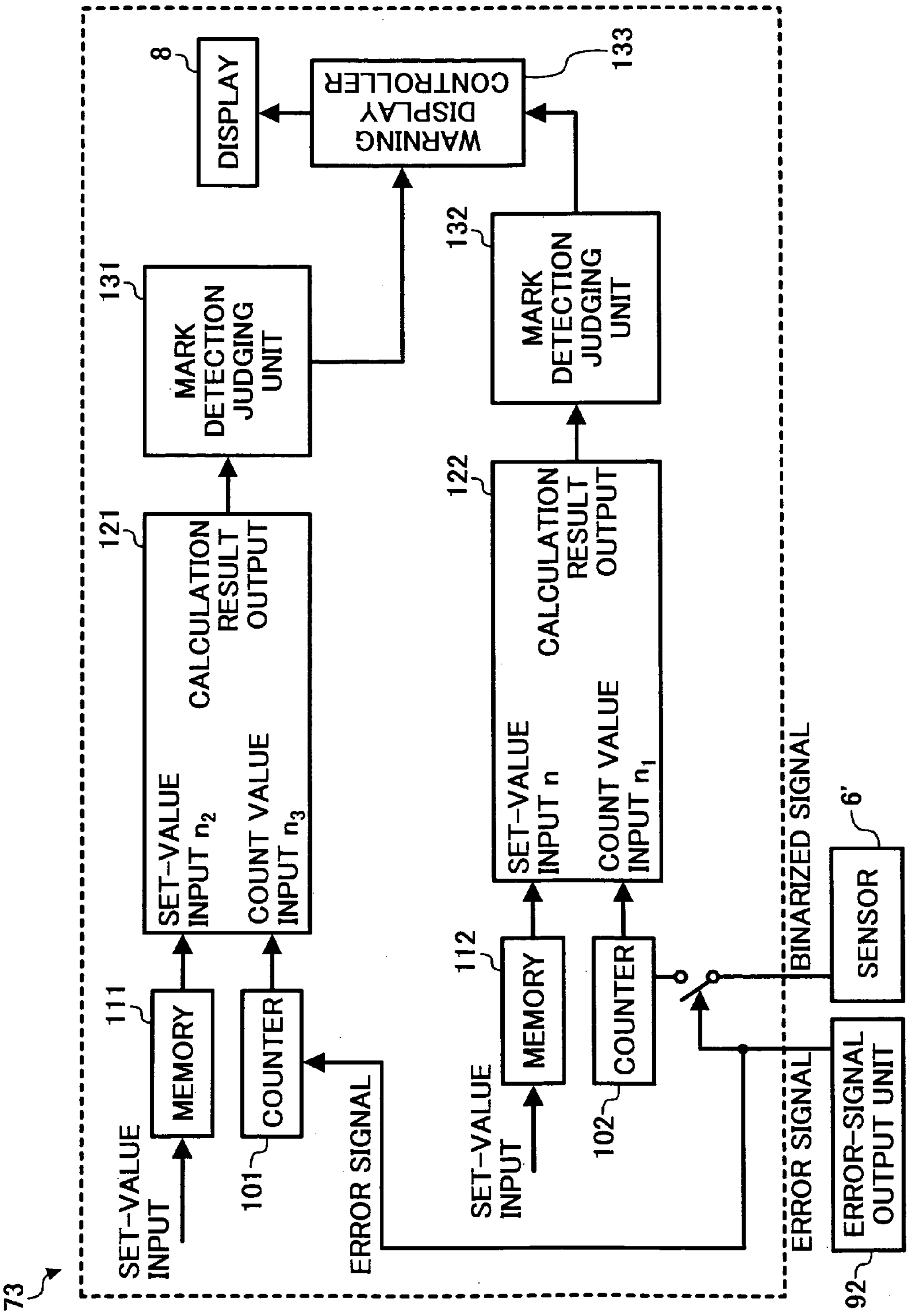
FIG. 18 is a block diagram of a mark-degradation monitoring system of an intermediate transfer unit as an example of an endless-moving-member driving unit according to an embodiment A4 of the present invention.
Figure 19:
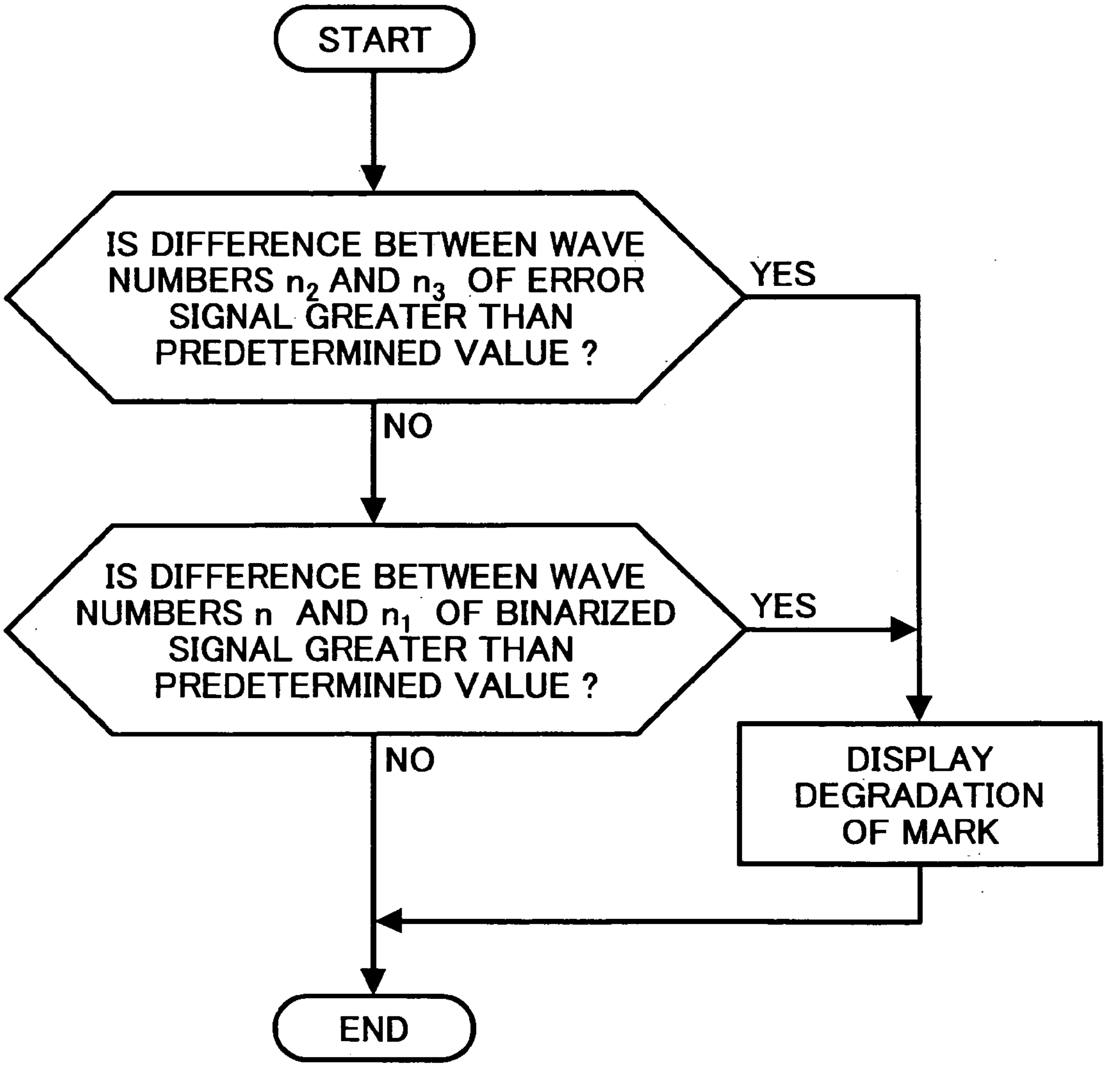
FIG. 19 is a flowchart of a process procedure for monitoring degradation of the marks on the intermediate transfer belt by the control system of the intermediate transfer unit according to the embodiment A4.

FIG. 18 is a block diagram illustrating a mark-degradation monitoring system of the intermediate transfer unit, which is the endless-moving-member driving unit according to an embodiment A4. FIG. 19 is a flowchart of a routine of monitoring degradation of the marks by the control system of the intermediate transfer unit. Same reference numerals are used for elements identical with those in FIG. 11.

The intermediate transfer unit according to the embodiment A4 has a structure of mechanisms similar to that of the intermediate transfer unit 20 according to the embodiment A1 described by referring to FIGS. 1 to 10 except for the scale 5' and the sensor 6' that detects the scale 5', which differ from the scale 5 and the sensor 6 in the intermediate transfer unit 20. Apart from this, a control of the belt speed in the intermediate transfer unit according to the embodiment A4 differs from that of the intermediate transfer unit 20 according to the embodiment A1. Hence, diagrammatic indication and detailed description of the mechanism of the intermediate transfer unit are omitted. Reference numerals used in FIG. 2 are used in a description wherever necessary.

According to the embodiment A4, a control system that drives the belt driving motor is similar to that in FIG. 1; hence the diagrammatic indication is omitted.

The intermediate transfer unit according to the embodiment A4, similar to the intermediate transfer unit according to the embodiment A3, includes the sensor 6' and the error-signal outputting section 92. The sensor 6' detects the scale 5' on the intermediate transfer belt 10 and outputs the analog alternating signal that is continuously modulated. The sensor 6' then converts the analog alternating signal to the binary signal and outputs the binary signal.

Moreover, the intermediate transfer unit has a controller 73 that includes a first counter 101, a memory 111, which is a first storage unit, a first arithmetic circuit 121, and a first mark-detection judging section 131 (first detected-portion defect judging unit). The first counter 101 counts a wave number $n_3$ of an error signal Se that is output from the error-signal outputting section 92. The memory 111 stores the wave number $n_3$ of the error signal, which is output from the error-signal outputting section 92 when the sensor 6' detects a portion of the normal scale 5' during a predetermined time $t_1$ that is set voluntarily. The first arithmetic circuit 121 is a first calculating unit that calculates a difference between a wave number $n_2$ when the normal portion of the scale 5' stored in the memory 111 is detected and the wave number $n_3$ of the error signal Se that is counted by the first counter 101 during the time interval same as the predetermined time $t_1$. The first mark-detection judging section 131 judges the scale 5' to be defective when the difference between the wave numbers $n_2$ and $n_3$ that is calculated by the first arithmetic circuit 121 is greater than the predetermined value.

The controller 73 further includes a second counter 102, a memory 112, which is a second storage unit, a second arithmetic circuit 122, and a second mark-detection judging section 132 (second detected-portion defect judging section). The second counter 102 counts a wave number $n_1$ of a binary signal that is output from the sensor 6'. The memory 112 stores a wave number n of the binary signal that is output when the sensor 6' detects the normal portion of the scale 5' during the predetermined time $t_1$, which is set voluntarily. The second arithmetic circuit 122, which is a second calculating unit, calculates a difference between the wave number n that is, stored in the memory 112 and a wave number $n_1$ that is counted by the second counter 102 during a time interval same as the predetermined time interval $t_1$. The second mark-detection judging section 132 judges the scale 5' to be defective when the difference between the wave numbers n and $n_1$ that is calculated by the second arithmetic circuit 122 becomes greater than the predetermined value.

The controller 73 also includes a warning-display controller 133. The warning-display controller 133 functions as a warning display unit that controls to display warnings on the display 8, which is disposed at a position visible form-outside. The warnings displayed on the display 8 include warnings such as an indication of degradation of the scale 5' and changing of a speed control of the intermediate transfer belt 10 to the dummy-signal control. When at least one of the first mark-detection judging section 131 and the second mark-detection judging section 132 makes a judgment of a portion being defective, these warnings are displayed.

A control system of the intermediate transfer unit starts routine of the monitoring of the mark degradation shown in FIG. 19 at a predetermined timing.

To start with, at a first step, the control systems makes a judgment of whether the difference between the wave numbers $n_2$ and $n_3$ of the error signals has become greater than the predetermined value. If the difference between $n_2$ and $n_3$ is not greater than the predetermined value, the control moves to the next judgment since the marks 5*a*' on the slits 5' are not degraded to an extent to be judged to be defective. If the difference between the wave numbers $n_2$ and $n_3$ has become greater than the predetermined value (judged to be defective—Y), since the marks 5*a*' on the slits 5' are degraded to an extent to be judged to be defective, the indication of mark degradation is displayed on the display 8 and the control system ends the process.

If the difference between the wave numbers $n_2$ and $n_3$ is not greater than the predetermined value and if the control system moves on to the next judgment, the control system makes a judgment of whether the difference between the wave numbers n and $n_1$ of the error signal of the binary signal is greater than the predetermined value. If the difference between n and $n_1$ is not greater than the predetermined value, since the marks 5*a*' on the slits 5' are not degraded to the extent to be judged to be defective, the control system ends the process. If the difference between n and $n_1$ is greater than the predetermined value (judged to be defective—Y), since the marks 5*a*' on the slits 5' are degraded to the extent to be judged to be defective, the indication of mark degradation is displayed on the display 8 and the control system ends the process.

Thus, the intermediate transfer unit detects the number of defective portions (such as breakage, contamination, and damage) of the slits 5' based on the error signal that is output from the error-signal outputting section 92 and an area of the defective portion of the slits 5' from the wave number of the binary signal that is output from the sensor 6'. If the slits 5' are judged to be defective due to any of the error signal and the binary signal, the warning indicating the degradation of the slits 5' is displayed on the display 8.

At this time, although it is not shown in FIG. 19, the warning indicating that the speed control of the intermediate transfer belt 10 is changed to the dummy-signal control is displayed on the display 8 as well.

Thus, since the degradation of the slits 5' can be monitored with high accuracy, this is useful particularly for monitoring a change in the degradation with the elapsing of time.

The embodiments A1 to A4 of the present invention have been described so far and in each of these embodiments the predetermined time $t_1$ can be determined voluntarily. If the predetermined time $t_1$ is set to be shorter than the time taken for one revolution of the intermediate transfer belt 10 or 10', a change with the elapsed time for a partial area of the marks 5 or 5' on the intermediate transfer belt 10 or 10' can be known.

If the predetermined time $t_1$ is set to be equal to the time taken for one revolution of the intermediate transfer belt 10 or 10', by storing or counting of a wave number of the error signal and the binary signal once, all the marks 5 or 5' on the intermediate transfer belt 10 or 10' can be stored and counted without being repeated.

Figure 20:
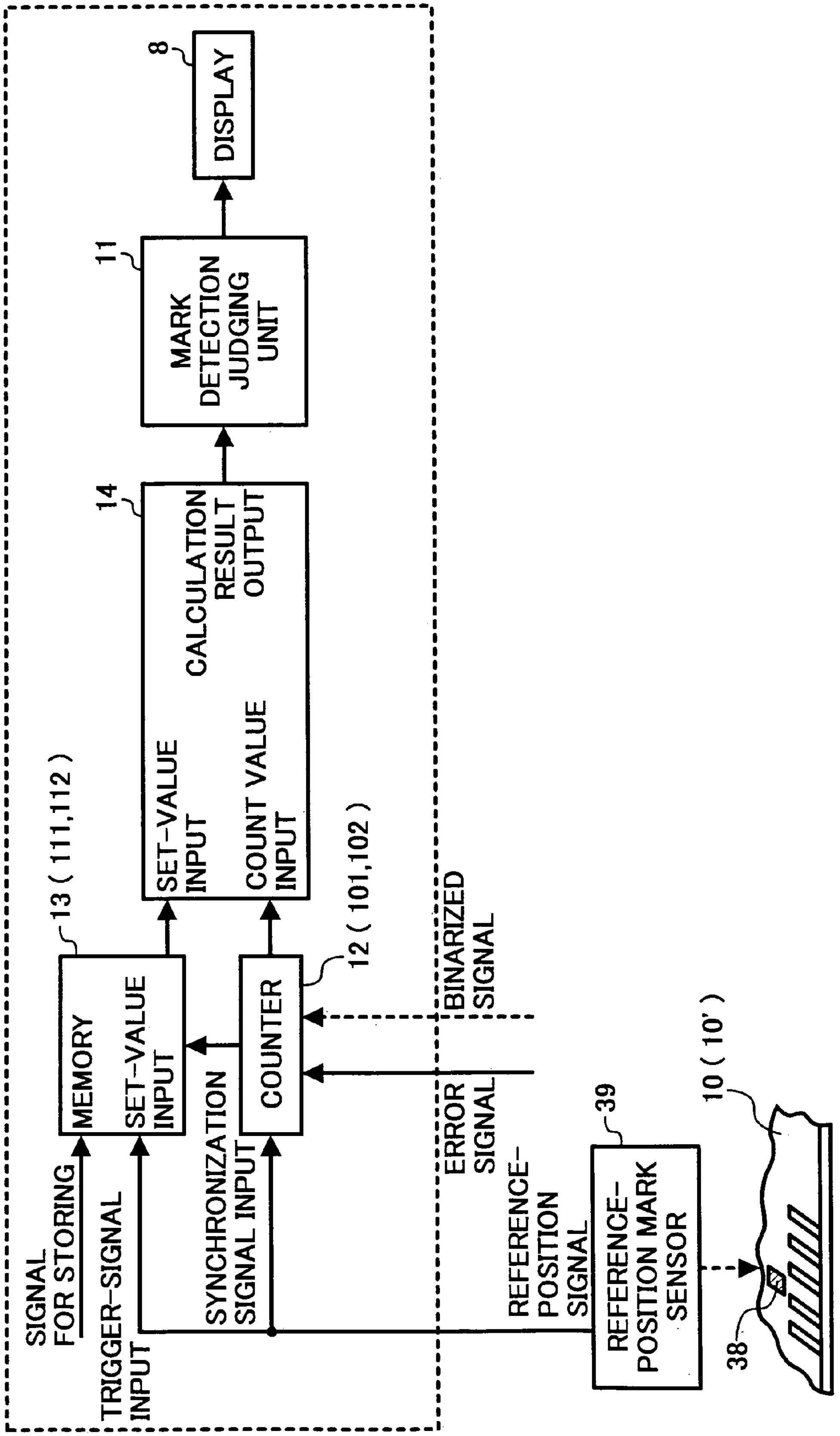
FIG. 20 is a block diagram of a controller of a mark-degradation monitoring system of an intermediate transfer unit as an example of an endless-moving-member driving unit according to an embodiment A5 of the present invention.
Figure 21:
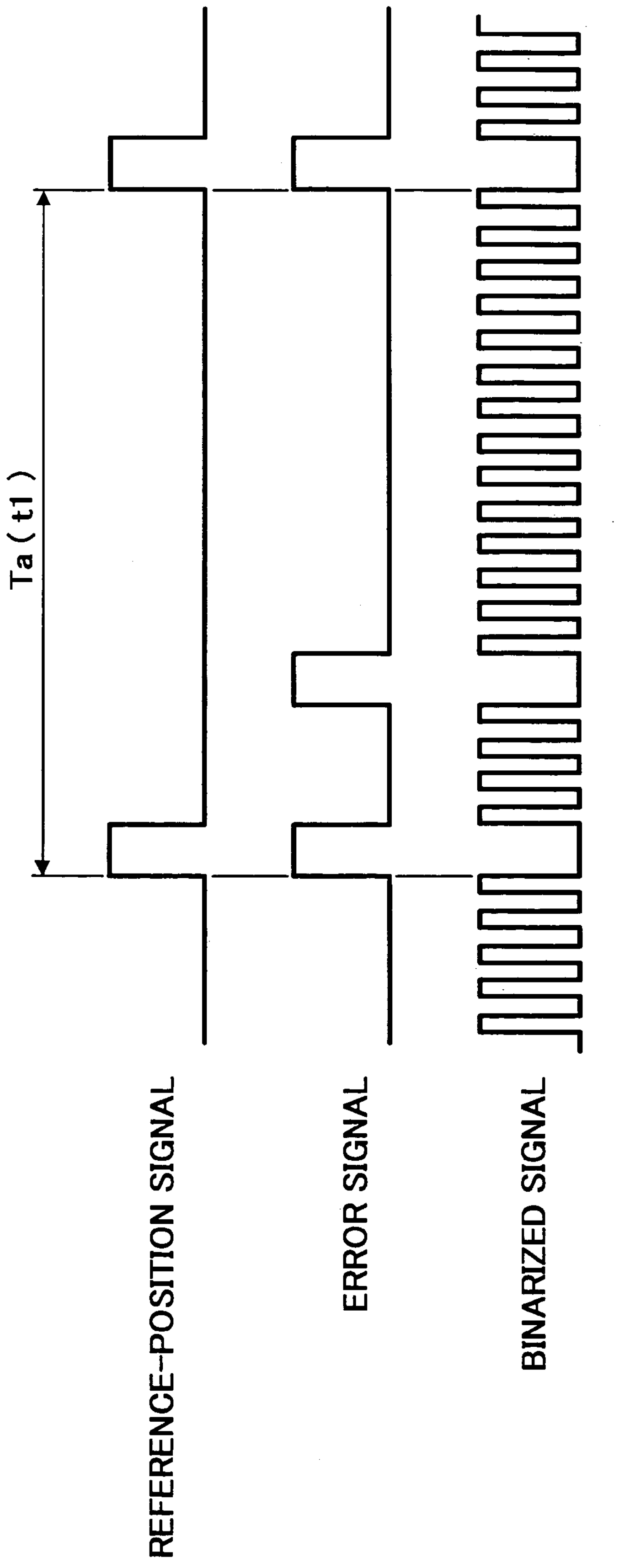
FIG. 21 is a waveform of a reference-position signal used for monitoring the mark-degradation by the intermediate transfer unit, along with a binary signal and an error signal according to the embodiment A5.

FIG. 20 is a block diagram only of a controller of the mark-degradation monitoring system of an intermediate transfer unit, which is the endless-moving-member driving unit according to an embodiment A5. FIG. 21 is a waveform diagram of a reference-position signal that is used for monitoring the mark-degradation by intermediate transfer unit, along with a binary signal and an error signal according to the embodiment A5.

The intermediate transfer unit according to the embodiment A5 has a structure of mechanisms similar to that of the intermediate transfer unit 20 according to the embodiment A1 described by referring to FIGS. 1 to 10 except for the scale 5' and the sensor 6' that detects the scale 5', which differ from the scale 5 and the sensor 6 in the intermediate transfer unit 20. Apart from this, a control of the belt speed in the intermediate transfer unit according to the embodiment A5 differs from that of the intermediate transfer unit 20 according to the embodiment A1. Hence, diagrammatic indication and detailed description of the mechanism of the intermediate transfer unit are omitted. Reference numerals used in FIG. 2 are used in a description wherever necessary.

Moreover, since an output system of an error signal and a binary signal in FIG. 20 and a control system related to the output system are similar to those described by referring to FIG. 11, the diagrammatic indication is omitted.

In the intermediate transfer unit according to the embodiment A5, a reference-position mark 38 that indicates a reference position of the direction of rotation of the intermediate transfer belt 10 or 10' in the intermediate transfer unit according to the embodiments A1 to A4, is provided. The intermediate transfer unit according to the embodiment A5 includes a reference-position mark sensor 39. The reference-position mark sensor 39 functions as a reference-position mark detecting unit that detects the reference-position mark 38.

The predetermined time $t_1$ according to the embodiments A1 to A4 is let to be a time from the detection of the reference-position mark 38 on the intermediate transfer belt 10 during rotation, by the reference-position mark sensor 39 to the subsequent detection of the reference-position mark 38. A timing of storage-start of a wave number that stores in the memory 13 (111, 112) a trigger signal when the reference-position mark sensor 39 detects the reference-position mark 38 is used and the trigger signal is used as a timing to start counting of the wave number by the counter 12 (101, 102). These are points where the embodiment A5 differs from the embodiments A1 to A4.

According to the intermediate transfer unit, as shown in FIG. 21, time from the output of the reference-position signal upon detection of the reference-position mark 38 to the output of the subsequent reference-position signal is let to be the time taken for one revolution of the intermediate transfer belt 10 (matching with cycle Ta).

The reference-position signal is used as a timing of storage-start of the wave number stored in the memory 13 (111, 112). By using the trigger signal as the timing to start counting the wave number by the counter 12 (101, 102), wave number during the time from the output of the reference-position signal to the output of the subsequent reference-position signal (predetermined time $t_1$) is counted.

According to the intermediate transfer unit, the signal upon detection by the reference-position mark sensor 39 of the reference-position mark 38 provided at one location is used as the trigger signal. Therefore, data for detecting the degradation of the scale 5 or 5' from the same position of the intermediate transfer belt 10 every time (for each revolution) can be fetched.

Moreover, by letting the time from the output from the reference-position mark sensor 39 to the subsequent output, to be the time taken for one revolution of the intermediate transfer belt 10, even if there is a change in the time required for one revolution of the intermediate transfer belt 10 or 10' due to stretching of the belt, all the marks on the scale 5 or 5' on the intermediate transfer belt 10 or 10' can be counted without being repeated, and can be stored.

Figure 22:
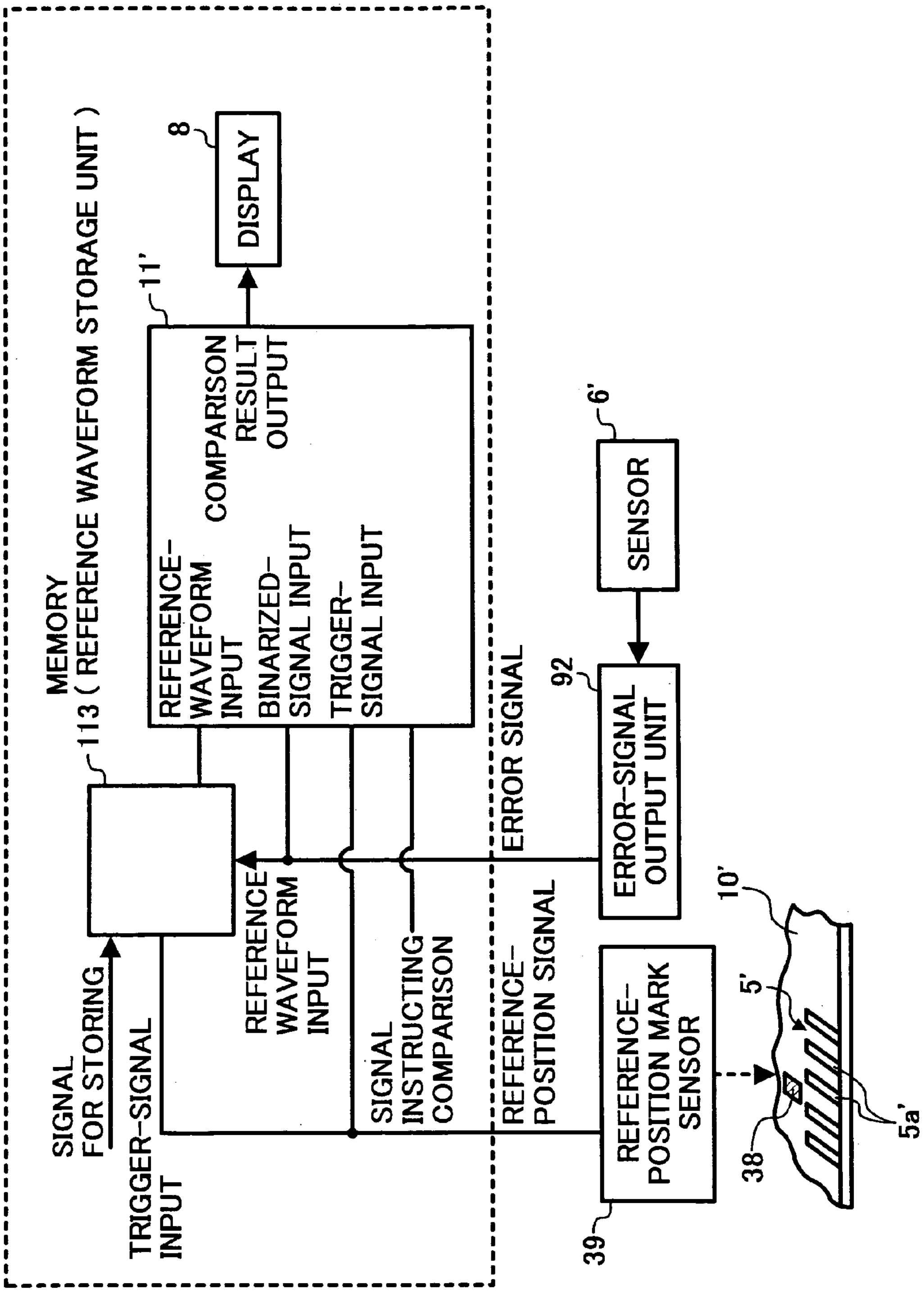
FIG. 22 is a block diagram of a controller of a mark-degradation monitoring system of an intermediate transfer unit as an example of an endless-moving-member driving unit according to an embodiment A6 of the present invention.
Figure 23:
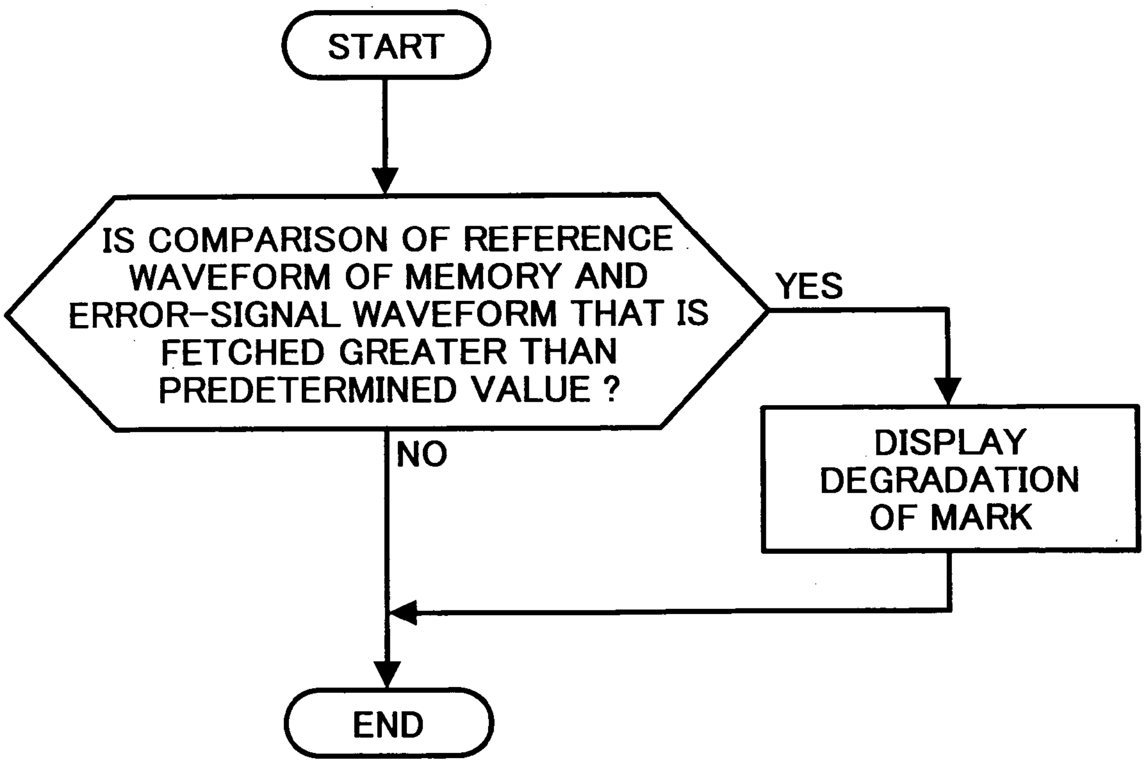
FIG. 23 is a flowchart of a process procedure for monitoring degradation of the marks by the control system of the intermediate transfer unit according to the embodiment A6.

FIG. 22 is block diagram of only a controller of the mark-degradation monitoring system of the intermediate transfer unit, which is the endless-moving-member driving unit according to an embodiment A6. FIG. 23 is a flowchart of a routine of monitoring degradation of the marks by the control system of the intermediate transfer unit according to the embodiment A6.

The intermediate transfer unit according to the embodiment A6 has a structure of mechanisms similar to that of the intermediate transfer unit 1 according to the embodiment A1 described by referring to FIGS. 1 to 10 except for the scale 5' and the sensor 6' that detects the scale 5', which differ from the scale 5 and the sensor 6 in the intermediate transfer unit 20. Apart from this, a control of the belt speed in the intermediate transfer unit according to the embodiment A6 differs from that of the intermediate transfer unit 20 according to the embodiment A1. Hence, diagrammatic indication and detailed description of the mechanisms of the intermediate transfer unit are omitted. Reference numerals used in FIG. 2 are used in a description wherever necessary.

Moreover, since an output system of an error signal and a binary signal in FIG. 22 and a control system related to the output system are similar to those described by referring to FIG. 11, the diagrammatic indication is omitted.

In the intermediate transfer unit according to the embodiment A6, similar to the intermediate transfer unit according to the embodiment A5, a reference-position mark 38 is provided. The intermediate transfer unit includes a reference-position mark sensor 39 that detects the reference position mark 38.

The intermediate transfer unit includes the error-signal outputting section 92 and the memory 113. The error-signal outputting section 92 outputs an error signal when a defective portion of the scale 5' is detected based on a change in an output level of an analog alternating signal upon detection of the scale 5' on the intermediate transfer belt 10'. The memory 113 is a reference-waveform storage unit that stores a signal waveform, which is output from the error-signal outputting section 92 throughout one revolution of the intermediate transfer belt 10' at a timing of a start and an end of waveform fetching, the timing being a trigger signal when the reference-position mark sensor 39 detects the reference-position mark 38 in the initial stage of the use of the intermediate transfer belt 10'.

Moreover, the intermediate transfer unit includes a mark-detection judging section 11'. The mark-detection judging section 11' functions as a warning display unit that controls to display on the display 8 a warning, which is an indication of degradation of the scale 5'. The mark-detection judging section 11' compares the signal waveform, which is for reference and is stored in the memory 113 with the signal waveform, which is output from the error-signal outputting section 92. If the resultant value of the waveform comparison is greater than the predetermined value, the mark-detection judging section 11' judges the scale 5' to be defective and displays the warning indicating degradation of the scale 5'.

The control system of the intermediate transfer unit starts routine shown in FIG. 23 at the predetermined timing.

In this process, a judgment of whether the resultant value of the comparison between the signal waveform (reference waveform) that is for reference and is stored in the memory 113 and a signal waveform that is output from the error-signal outputting section 92 throughout one revolution of the intermediate transfer belt 10' at a timing of a start and an end of waveform fetching, is greater than the predetermined value, is made. Here, the timing is the trigger signal after the intermediate transfer belt 10' is used for desired time.

If the resultant value upon comparison is not greater than the predetermined value, since the marks 5*a'* on the slits 5' are not degraded to an extent to be judged to be defective, the process is ended. If the resultant value upon comparison is greater than the predetermined value (judged to be defective—Y), since the marks 5*a'* on the slits 5' are degraded to an extent to be judged to be defective, the mark degradation and the change in the speed control of the intermediate transfer belt 10' to the dummy-signal control are displayed (not shown in the diagram) on the display 8 and the process is ended.

Thus, the intermediate transfer unit, in the initial period of use of the intermediate transfer belt 10', starts fetching the signal waveform of the error signal that is output based on the change in the output level of the analog alternating signal, by starting to fetch the signal that is output by the sensor 6' based on the trigger signal when the reference-position mark sensor 39 (such as an optical sensor) detects the reference position mark 38, which shows a reference position in the direction of rotation of the intermediate transfer belt 10'. The intermediate transfer unit, then ends fetching the signal waveform when the trigger signal is output once again after one revolution of the intermediate transfer belt 10' and stores in the memory 113 the signal waveform of the error signal that is fetched during one revolution of the intermediate transfer belt 10', thereby performing the method of degradation process of the endless moving-member.

In the method of degradation process of the endless moving-member, the signal waveform for the reference that is stored in the memory 113 and the signal waveform of the error signal that is fetched during one revolution of the intermediate transfer belt 10' at timings of the start and the end of fetching the signal waveform after using the intermediate transfer belt 10' for desired time, the timing being the trigger signal. If the resultant value of the comparison is greater than the predetermined value, the scale 5' is judged to be defective and the warnings that indicate the degradation of the slits 5' and the change in the speed control of the intermediate transfer belt 10' to the dummy-signal control are displayed on the display 8.

If the resultant value of the comparison of the reference wave form that is stored in the memory 113 in the initial state of use of the intermediate transfer belt 10' and the signal waveform of the error signal, which is fetched at time interval same as the fetching timing after using the intermediate transfer belt 10' for desired time, is greater than a range regulated in advance (predetermined value), the marks 5*a'* on the scale 5' are judged to be defective and the indication of degradation of marks is displayed on the display 8. This enables to monitor the change in the defective portion (degradation due to non-uniform interval between the marks 5*a'*, contamination, and damage on the marks 5*a'*) on the scale 5' during the period starting from the storing of the reference waveform to the point of a time after using for desired time.

Figure 24:
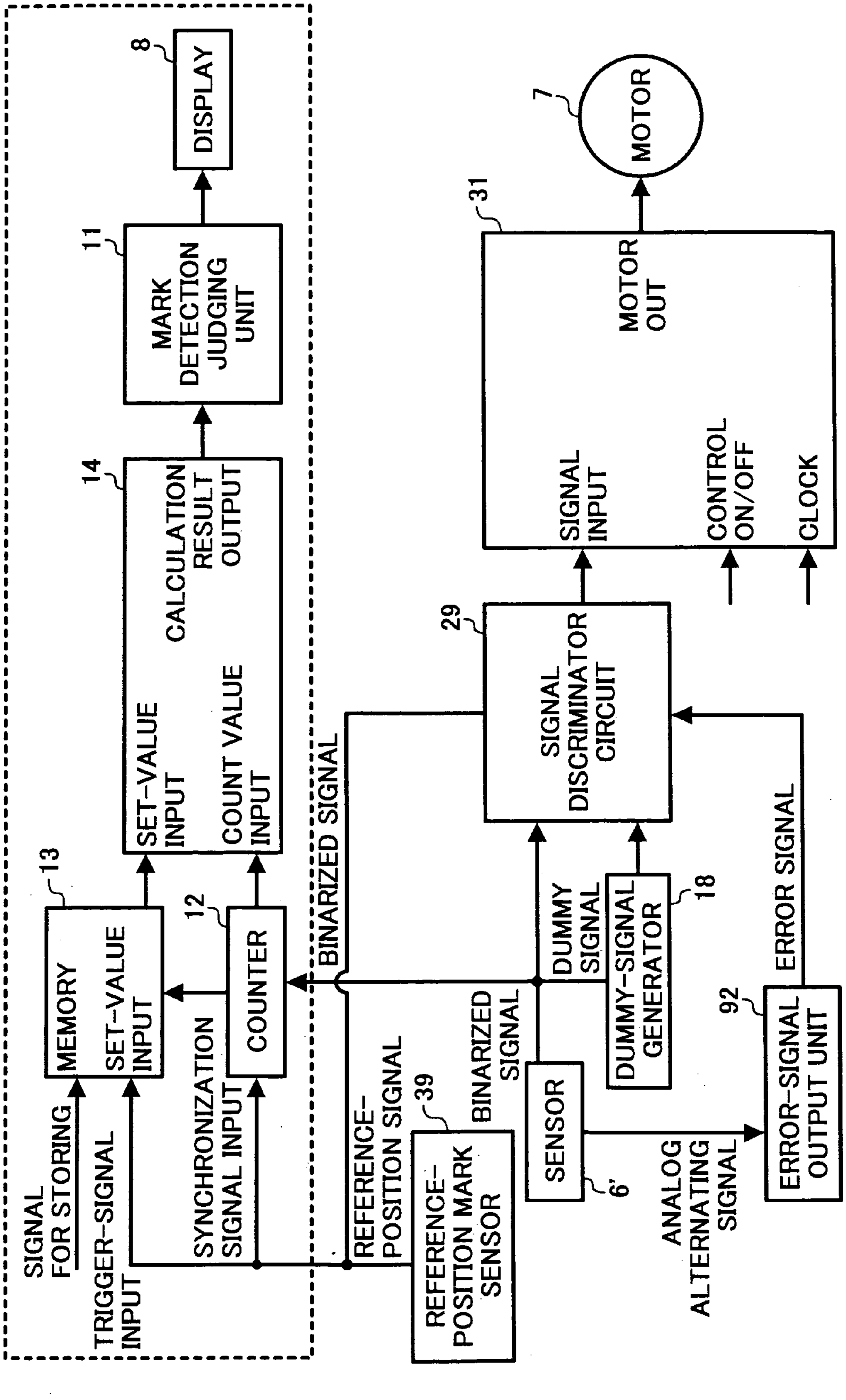
FIG. 24 is a block diagram of a control system of an intermediate transfer unit as an example of an endless-moving-member driving unit according to an embodiment A7 of the present invention.

FIG. 24 is a block diagram similar to FIG. 1 of a control system of an intermediate transfer unit, which is the endless-moving-member driving unit according to an embodiment A7. Same reference numerals are used for elements identical with those in FIGS. 11 and 20.

The intermediate transfer unit according to the embodiment A7 has a structure of mechanisms similar to that of the intermediate transfer unit 20 according to the embodiment A1 described by referring to FIGS. 1 to 10 except for the scale 5', and the sensor 6' that detects the scale 5', which differ from the scale 5 and the sensor 6 in the intermediate transfer unit 20. Apart from this, a control of the belt speed in the intermediate transfer unit according to the embodiment A7 differs from that of the intermediate transfer unit 20 according to the embodiment A1. Hence, the diagrammatic indication and the detailed description of the mechanism of the intermediate transfer unit are omitted. Reference numerals used in FIG. 2 are used in a description wherever necessary.

In the intermediate transfer unit according to the embodiment A7, in the intermediate transfer unit according to any one of the intermediate transfer units in the embodiments A5 and A6, the intermediate transfer belt 10' has a joint at which the scale 5' is not at a predetermined interval (see the portion 5*c* of the breakage in the marks shown in FIG. 8) in the direction of rotation. The reference-position mark 38 and the reference-position mark sensor 39 (see FIGS. 20 and 22) are provided corresponding to the joint portion and even when the reference-position mark sensor 39 detects the reference-position mark 38, the speed control (or the position control) of the intermediate transfer belt 10' is changed from the normal control to the dummy-signal control, which is different from the normal control.

According to this intermediate transfer unit, in the joint portion of the scale 5' where the error signal is output and the binary signal is not detected at the predetermined interval, the reference-position mark sensor 39 detects the reference-position mark 38. Due to the detection of the reference-position mark 38, the error signal and a binary signal of the discontinuous portion are masked and during this, the speed control of the intermediate transfer belt 10' is changed to the dummy-signal control. Therefore, the speed of the intermediate transfer belt 10' can be controlled even at the joint portion.

Further, the reference-position mark 38 is provided on the joint portion of the scale 5'. Therefore, when the reference-position mark sensor 39 detects the reference-position mark 38, the joint portion can be excluded from the counting of the wave number of the signal so that it is not let it to be a defect of the scale 5'. This enables monitoring of the detective portion of the scale 5' even more accurately.

It is desirable that a width of the reference-position mark 38 of the intermediate transfer belt 10' in the direction of rotation is greater than a width of the joint in the direction of rotation. If the width is greater, for a signal width of an error signal in which an error has occurred due to the setting of a threshold value, a width of masking of the error signal increases, thereby enabling more accurate control.

Figure 25:
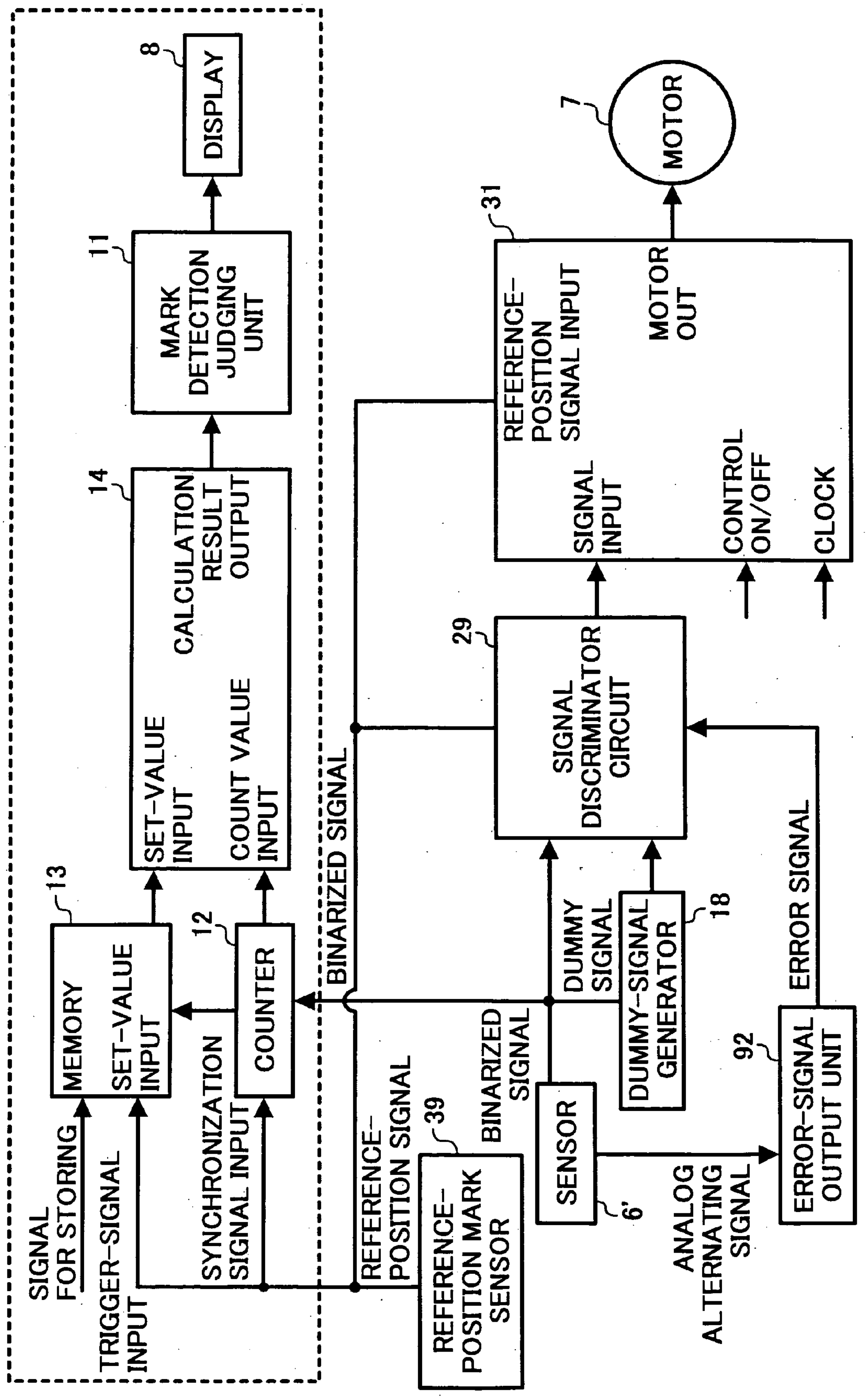
FIG. 25 is a block diagram of a control system of an intermediate transfer unit as an example of an endless-moving-member driving unit according to an embodiment A8 of the present invention.

FIG. 25 is a block diagram similar to FIG. 1, of a control system of an intermediate transfer unit, which is the endless-moving-member driving unit according to an embodiment A8. Same reference numerals are used for elements identical with those in FIG. 24.

The intermediate transfer unit according to the embodiment A8 has a structure of mechanisms similar to that of the intermediate transfer unit 20 according to the embodiment A1 described by referring to FIGS. 1 to 10 except for the scale 5', and the sensor 6' that detects the scale 5', which differ from the scale 5 and the sensor 6 in the intermediate transfer unit 20. Apart from this, a control of the belt speed in the intermediate transfer unit according to the embodiment A8 differs from that of the intermediate transfer unit 20 according to the embodiment A1. Hence, the diagrammatic indication and the detailed description of the mechanism of the intermediate transfer unit are omitted. Reference numerals used in FIG. 2 are used in a description wherever necessary.

In the intermediate transfer unit according to the embodiment A8, in the intermediate transfer unit according to any of the intermediate transfer units in the embodiments A5 and A7, the reference-position mark 38 also serves as a stopping-position specifying mark, which becomes a stopping-position reference while stopping the intermediate transfer belt 10' (see FIGS. 20 and 22).

This enables to control easily the stopping position in the direction of movement when the intermediate transfer belt 10' comes to halt.

Moreover, it is desirable that a stopping position of the direction of rotation with the reference-position mark 38, which becomes the stopping-position specifying mark as a reference, is shifted in the direction of rotation so that the stopping position of the direction of reference is not the same every time.

By doing so, the stopping position of the direction of movement of belt from the rollers (9, 15, and 16 in FIG. 2), which support the intermediate transfer belt 10' and the reference-position mark 38 of the scale 5', which is in contact with the rollers, changes every time whenever it stops. This enables to avoid curling tendency of the scale 5', thereby resulting in a desirable image quality.

A position at which the defective portion of the scale 5' on the intermediate transfer belt 10' coincides with any one of the driving roller 9, the driven rollers 15 and 16, which rotatably support the intermediate transfer belt, may be let to be the stopping position of the intermediate transfer belt 10'.

By doing so, the intermediate transfer belt 10' can be stopped on priority basis such that any one of the driving roller 9, and the driven rollers 15 and 16 coincide with the defective portion, which is caused due to the contamination or damage of the scale 5' over a comparatively wider area (length in the direction of the belt movement).

Even if the scale 5' tends to curl due to stopping of the intermediate transfer belt 10' for a longer time while it is in contact with any of the rollers, the speed control of the belt is not hindered since that portion is not the defective portion, which is used for the speed control. Further, a portion of the marks 5*a'* of the scale 5', which is in normal condition without any defective portion can be maintained in the same condition for longer time.

The intermediate transfer belt 10' may be stopped upon selecting a roller, which has a wider area of contact with the intermediate transfer belt 10' on priority basis so that the defective portion of the scale 5' coincides with the area of contact between the roller and the intermediate transfer belt 10'.

Figure 26:
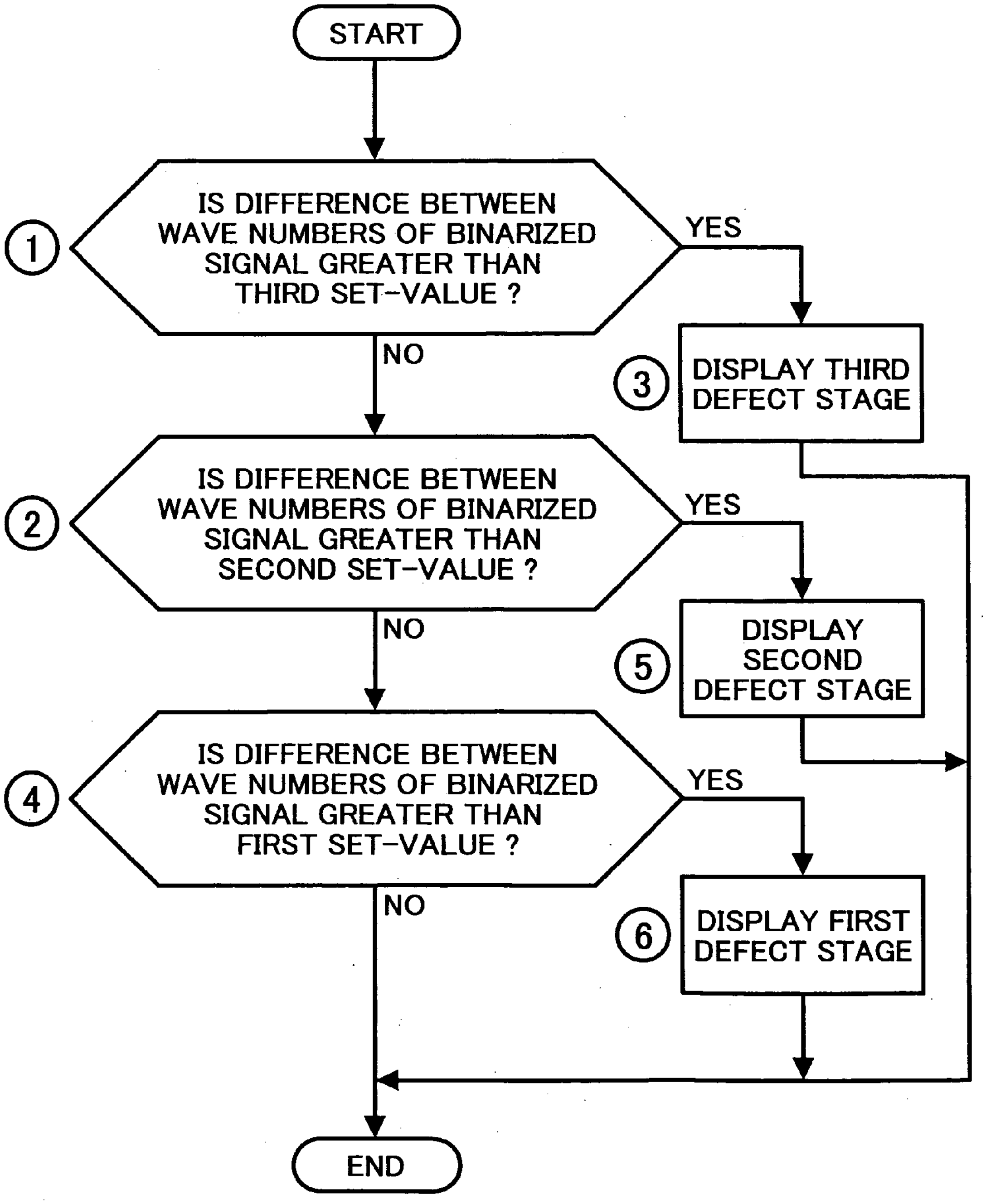
FIG. 26 is a flowchart of a process procedure for a mark-degradation monitoring performed by a control system of an intermediate transfer unit as an example of an endless-moving-member driving unit according to an embodiment A9 of the present invention.

FIG. 26 is a flowchart of a mark-degradation monitoring performed by a control system of an intermediate transfer unit, which is the endless-moving-member driving unit, according to an embodiment A9.

In the intermediate transfer unit according to the embodiment A9, only the speed control of the belt differs from that in the embodiments A1 to A8. The structure of mechanisms being similar, the diagrammatic indication and the detailed description of the mechanism of the intermediate transfer unit are omitted. Reference numerals used in FIG. 2 are used in a description wherever necessary.

In the intermediate transfer unit according to the embodiment A9, in the intermediate transfer unit according to any one of the intermediate transfer units in the embodiments A1 to A8 of the intermediate transfer unit, the mark-detection judging sections 11 and 11', which function as the warning-display units, a plurality of the predetermined values are provided. Whenever, each of the predetermined values becomes greater than the difference between the wave numbers, the scale 5 or 5' is judged to be defective, in stages. At every stage a warning indicating the degradation of the scale 5 or 5' and a warning indicating that the speed control of the intermediate transfer belt 10 is changed to the dummy-signal control, are displayed on the display 8. The intermediate transfer unit according to the embodiment A9 is thus a unit that controls the display of these warnings.

An example, in which the wave number is a binary signal, is shown in FIG. 26. The control system of this intermediate transfer unit starts a routine shown in FIG. 26 at a predetermined timing. To start with, at step 1, a judgment of whether a difference between a wave number of a binary signal that is stored in the memory and a wave number that is counted by the counter has become greater than a third predetermined value (third set-value), is made.

If the difference has not become greater than the third predetermined value, the process advances to step 2. If the difference has become greater than the third predetermined value, the process advances to step 3, displays a third defect display on the display 8, and then ends the process. The third defect display, which is of the most serious degree, informs that the speed control of the belt is changed to the dummy-signal control, which does not make use of the scale 5 (scale 5' when wave form is an error signal).

If the process has advanced to step 2 without the difference between the wave numbers becoming greater than the third predetermined value, a judgment of whether the difference between the wave numbers has become greater than a second predetermined value (second set-value) is made. If the difference between the wave numbers has not become greater than the second predetermined value, the process advances to step 4. If the difference between the wave numbers has become greater than the second predetermined value, the process advances to step 5, displays a second defect display, and then the process ends. The second defect display, which is of less serious degree than the third defect display informs on the display 8, which the user can see directly, that the scale 5' is degraded.

If the process has advanced to step 4 without the difference between the wave numbers becoming greater than the second predetermined value, a judgment of whether the difference between the wave numbers has become greater than a first predetermined value (first set-value) is made. If the difference between the wave numbers has not become greater than the first predetermined value, the process of this routine ends. If the difference between the wave numbers has become greater than the first predetermined value, the process advances to step 6, displays a first defect display, and then the process ends. The first defect display, which is of the least serious degree, informs on a display that is visible by a service man, that the scale 5 is degraded.

According to this intermediate transfer unit, the display indicating the degradation of the scale 5 enables not only to judge between the normal and the defective but also to inform in stages the degree of degradation. Therefore, it is useful for monitoring the degree of degradation of the scale 5' upon elapsing of time.

The following is a description of embodiments of an image forming apparatus that includes endless-moving-member driving unit according to the present invention.

Figure 27:
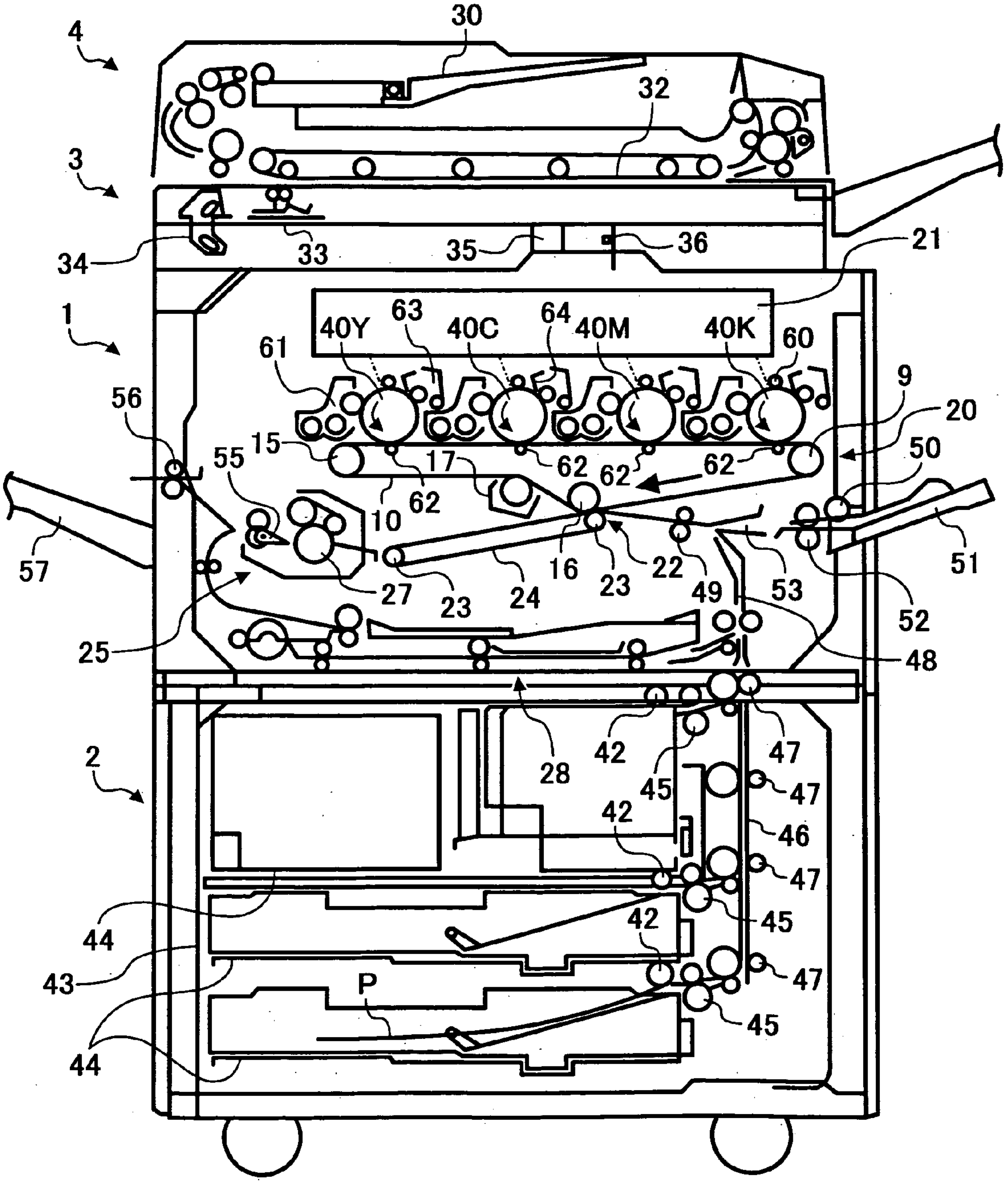
FIG. 27 is a schematic of an image forming apparatus according to an embodiment B1 of the present invention.

FIG. 27 is a schematic diagram of an image forming apparatus according to an embodiment B1 of the present invention. In this color copy machine, which is an image forming apparatus, an intermediate transfer belt 10 that is an image carrier, which rotates while holding an image on it, is the endless moving-member.

In this color copy machine, while making a color copy, a document is set on a document feed tray 30 of an automatic document feeder 4. For setting a document manually, the automatic document feeder 4 is opened and the document is set on an exposure glass 32 of a scanner 3. The automatic document feeder 4 is closed and the document is held.

As a start switch, which is not shown in the diagram is pressed, when the document is set on the automatic document feeder 4, the document is fed on to the exposure glass 32. When the document is set manually on the exposure glass 32, the scanner 3 is driven immediately and a first scanning component 33 and a second scanning component 34 start traveling. Light is irradiated from a light source of the first scanning component 33 towards the document. Reflected light from a surface of the document is directed towards the second scanning component 34 and is reflected from a mirror of second scanning component 34. The reflected light from the mirror passes through an image forming lens 35 and is incident on a reading sensor 36, which reads the content on the document.

With the pressing of the start switch, the intermediate transfer belt 10 of the intermediate transfer unit 20 starts rotating. Simultaneously, the photosensitive drums 40Y, 40C, 40M, and 40K start rotating. An operation, in which a single-color images of yellow, cyan, magenta, and black colors are formed by using a charging unit 60, an exposing unit 21, a developing unit 61, a primary transfer unit 62, a photosensitive-drum cleaning unit 63, and a decharging unit 64 around each of the photosensitive drums. The single color images formed on the photosensitive drums are transferred to be superimposed on the intermediate transfer belt 10, which rotates in the clockwise direction in FIG. 27 and a composite full color image is formed on the intermediate transfer belt 10.

On the other hand, when the start switch is pressed, a paper feeding roller 42 of a paper feeder that is selected in a paper feeding table 2 starts rotating and a sheet P is drawn out from a paper feeding cassette 44 that is selected from a paper bank 43. The sheet P, which is drawn out is separated by a separating roller 45 and carried to a paper feeding path 46.

The sheet P is carried by a transporting roller 47 to a paper feeding path 48 in a main body 1 of the copy machine, then strikes a registering roller 49, and stops for a time.

In a case of bypass feeding, a sheet P that is set on a bypass tray 51 is drawn by rotation of a paper feeding roller 50. The sheet P is separated by a separating roller 52 and this single separated sheet P is carried to a bypass paper feeding path 53. The sheet P then strikes the registering roller 49 and stops for a time.

The registering roller 49 starts rotating at an accurate timing matched with the composite color image on the intermediate transfer belt 10 and feeds the sheet P, which was stopped for a time, between the intermediate transfer belt 10 and a secondary transfer unit 22. The secondary transfer unit 22 transfers the color image to the sheet P.

The secondary transfer unit 22, which also has a function of a transporting unit, carries the sheet P with the color image transferred on it, to a fixing unit 25. The transferred image is fixed upon applying heat and pressure in the fixing unit 25. The sheet P is then directed to a discharge side by a guiding claw 55. A discharging roller 56 discharges the sheet P to a paper discharge tray 57 where it is stacked.

When a duplex copy mode is selected, the guiding claw 55 carries the sheet P with the image formed on one side to a sheet inverting unit 28 where it is turned over and directed to a transferring position. An image is formed on a reverse surface of the sheet P and the discharging roller 56 discharges the sheet P to the paper discharge tray 57.

After transferring the image on the sheet P, a cleaning unit 17 cleans a surface of the intermediate transfer belt 10.

Thus, according to the present invention, if the endless-moving-member driving unit is used in an intermediate transfer belt in a color copy machine, it is possible to monitor the degradation of the scale 5 or 5' on the intermediate transfer belt 10 that rotates while holding an image, thereby enabling not to use it in a defective condition (a condition in which the speed control of the belt cannot be performed with high accuracy). This enables to prevent occurrence of color shift in the color image that is formed.

Figure 28:
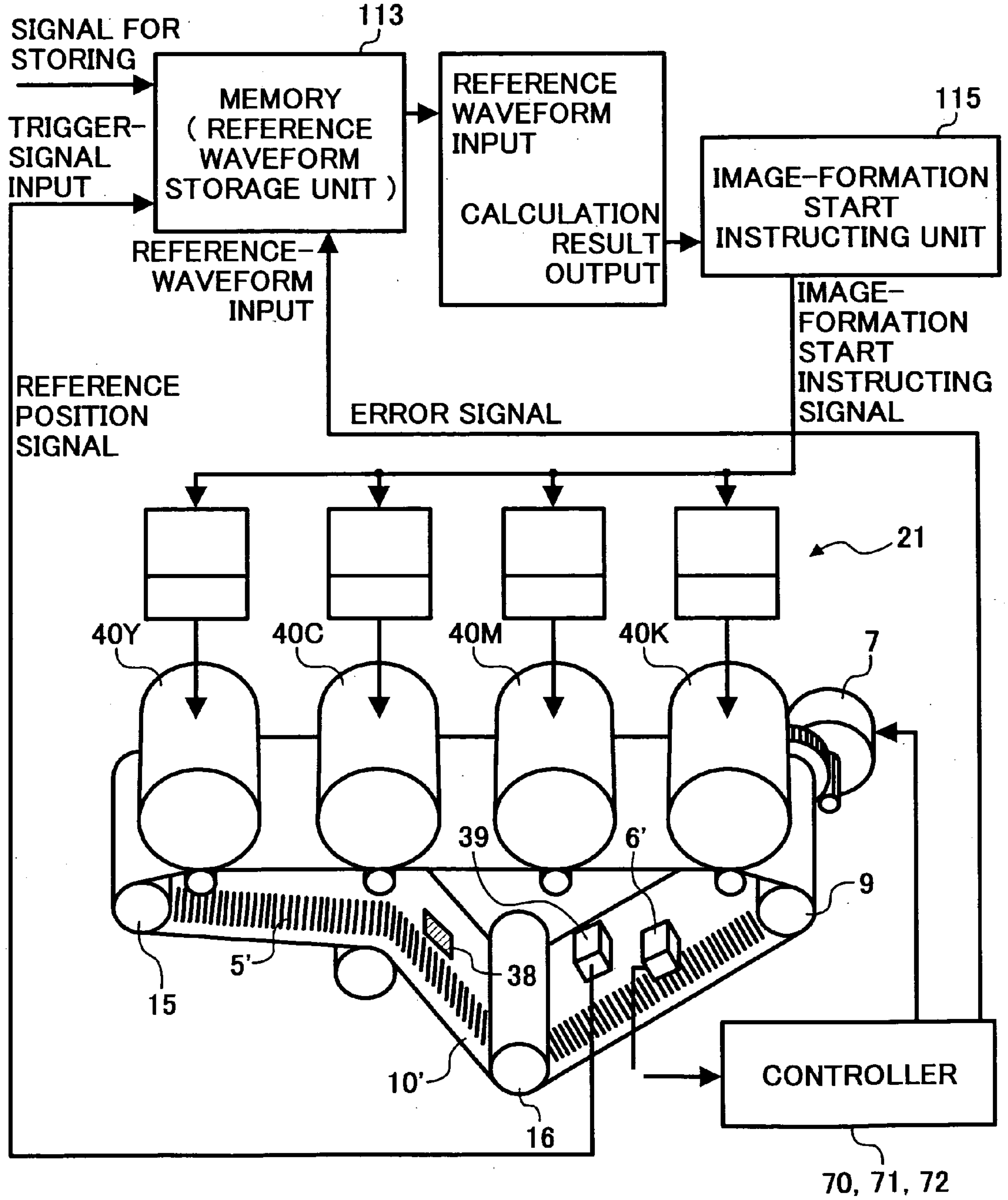
FIG. 28 is a schematic of an image forming apparatus according to an embodiment B2 of the present invention, along with a control system.
Figure 29:
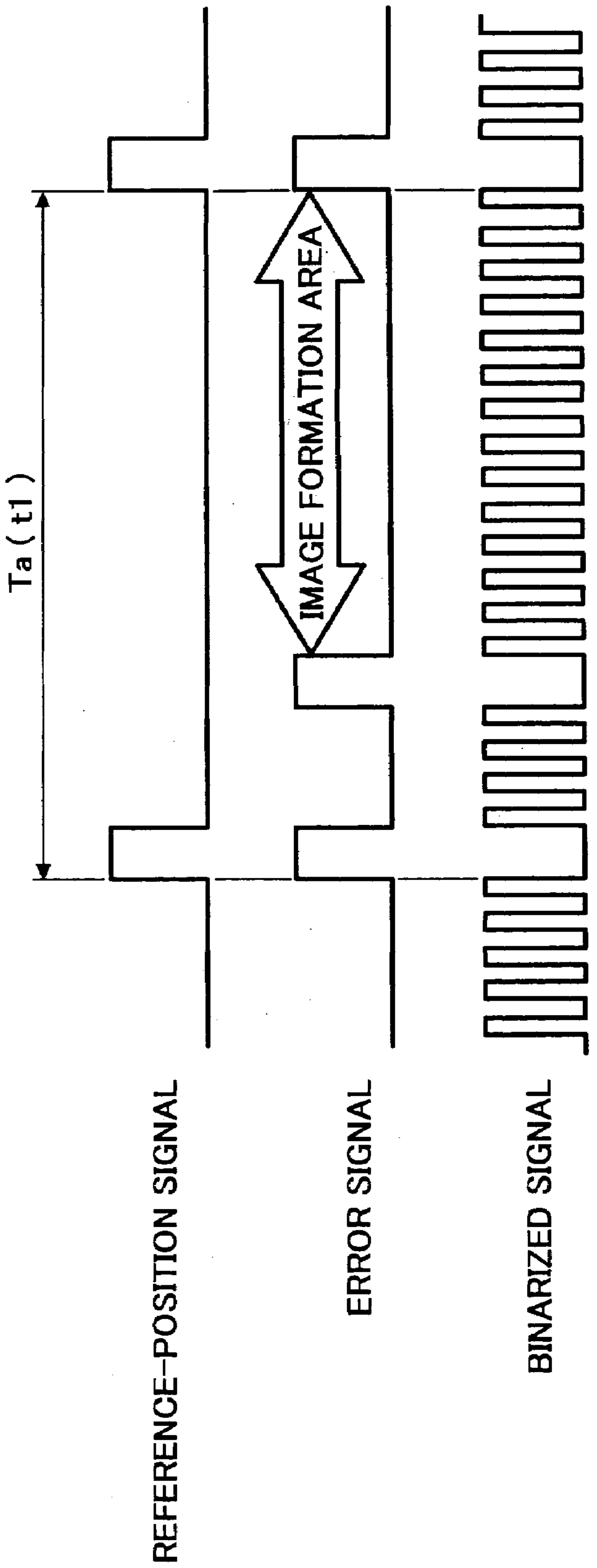
FIG. 29 is a waveform in an image formation area of the image forming apparatus according to the embodiment B2.

FIG. 28 is a schematic diagram of an image forming apparatus according to an embodiment B2, along with a control system. FIG. 29 is a waveform diagram illustrating an image formation area of the image forming apparatus according to the embodiment B2. Same reference numerals are used for elements, which are identical with those in FIGS. 22 and 27.

A color copy machine, which is the image forming apparatus, is basically similar to the color copy machine according the embodiment B1. The only difference is that a portion excluding an area that corresponds to the defective portion of the scale 5 of the intermediate transfer belt 10, which is an image carrier, is an image formation area as shown in FIG. 29.

In the image forming apparatus according to the embodiment B2, to have such an image formation area, an image-formation-start indicating section 115 controls a direction of movement of the intermediate transfer belt 10 and a timing of start of image formation, i.e. timing of transferring an image based on a result of calculation by the arithmetic circuit 114 disposed in a defect position. Therefore, while toner images of each color are transferred to the intermediate transfer belt 10, a proportion of defective portion of the scale 5' on the intermediate transfer belt 10 existing in a detection area can be reduced comparatively.

This enables to achieve reduced amount of position shift in image, which ensures highly accurate control of speed or position at the time of image transfer.

In a case where the endless moving-member carries the transferring material in the form of a sheet and a carrier belt goes on superimposing toner image of each color on the transferring material similarly, such an area is let to be an image formation area.

The following is a description of an embodiment of a photosensitive-element driving unit according to the present invention.

Figure 30:
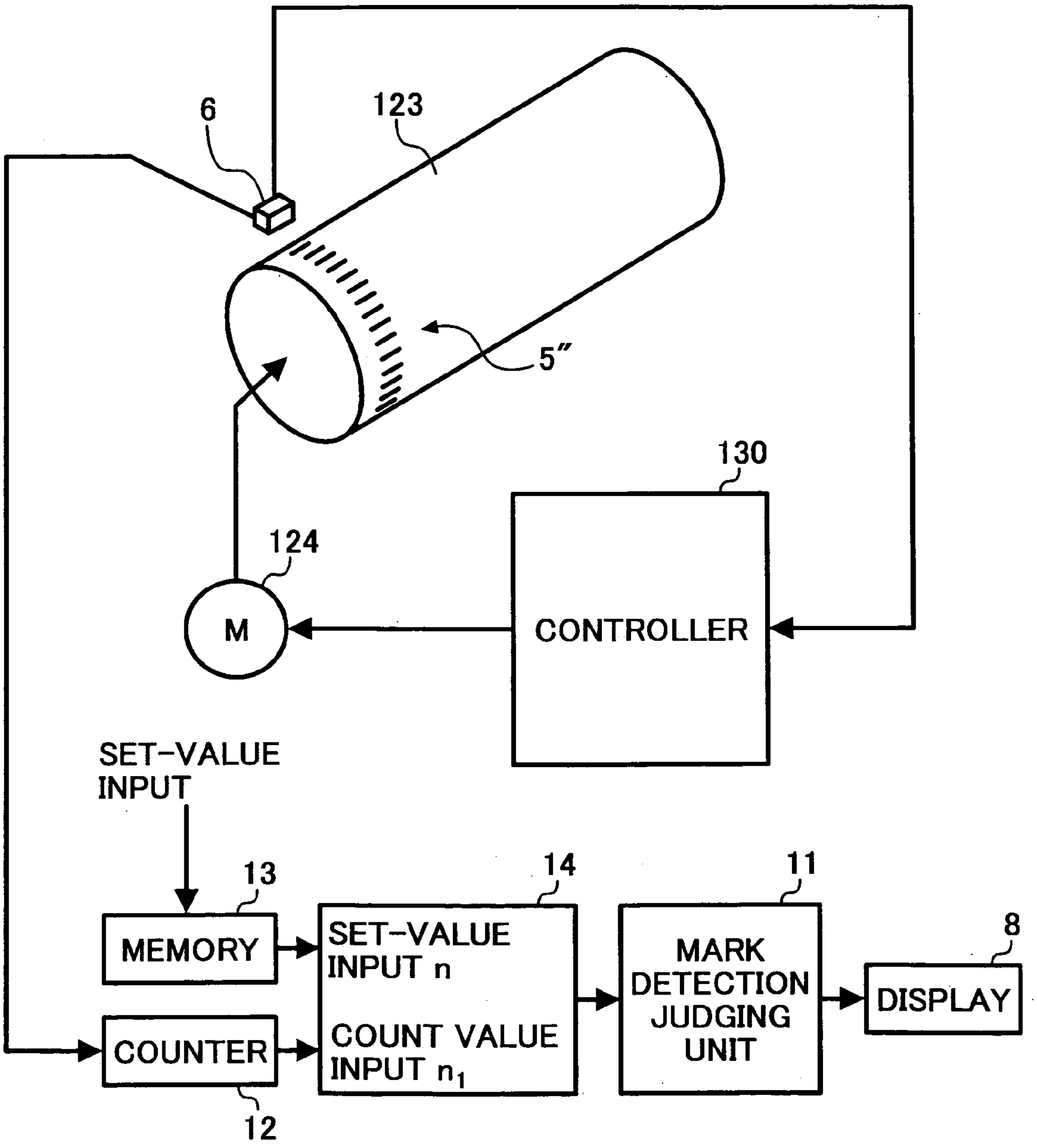
FIG. 30 is a perspective view of a photosensitive-element driving unit according to an embodiment C1 of the present invention.

FIG. 30 is a perspective view of a photosensitive-element driving unit according to an embodiment C1 of the present invention.

The embodiment C1 differs from the embodiment A1 only at a point that in the embodiment A1, the intermediate transfer belt 10 is let to be the endless moving-member, whereas in the embodiment C1 a photosensitive drum 123 that rotates is let to be the endless moving-member.

The photosensitive-element driving unit includes the photosensitive drum 123 and the sensor 6. The photosensitive drum 123 has a scale 5" to be detected, which is provided along the circumference of the photosensitive drum 123 at predetermined interval and is rotated by a motor 124. The sensor 6 outputs a result of the detection of the scale 5" as a binary signal.

A defective portion where the scale 5" is not detected at the predetermined interval is detected based on a change in the binary signal that is output by the sensor 6. When the defective portion is detected, a controller 130 changes a speed control (or position control) of the photosensitive drum 123 to the dummy-signal control, which differs from the normal control.

The photosensitive-element driving unit includes the counter 12, the memory (storage unit) 13, the arithmetic circuit 14, and the mark-detection judging section 11. The controller counts a wave number of a binary signal that is output from the scale 5". The memory 13 stores a wave number of a binary signal that is output when the sensor 6 detects a normal portion of the scale 5" a predetermined time $t_1$, which is set voluntarily. The arithmetic circuit 14 calculates a difference between the wave number, which is stored in the memory 13 and a wave number, which is counted by the counter during a time interval same as the predetermined time $t_1$. The mark-detection judging section 11 functions as a warning display unit that controls to display warnings on the display 8. The warnings displayed on the display 8 include warnings such as an indication of degradation of the scale 5" and changing of a normal speed (or position) control to the dummy-signal control of the photosensitive drum 123. The mark-detection judging section 11 judges the scale 5" to be defective when the difference between the wave numbers calculated by the arithmetic circuit 14 becomes greater than the predetermined value and causes to display the indication of degradation of the scale 5".

The photosensitive-element driving unit, similarly as in the cases of the intermediate transfer units, can judge degradation of the scale 5" that is provided on the photosensitive drum 123. Therefore, it is possible to prevent the formation of a faulty image that has a color shift.

Figure 31:
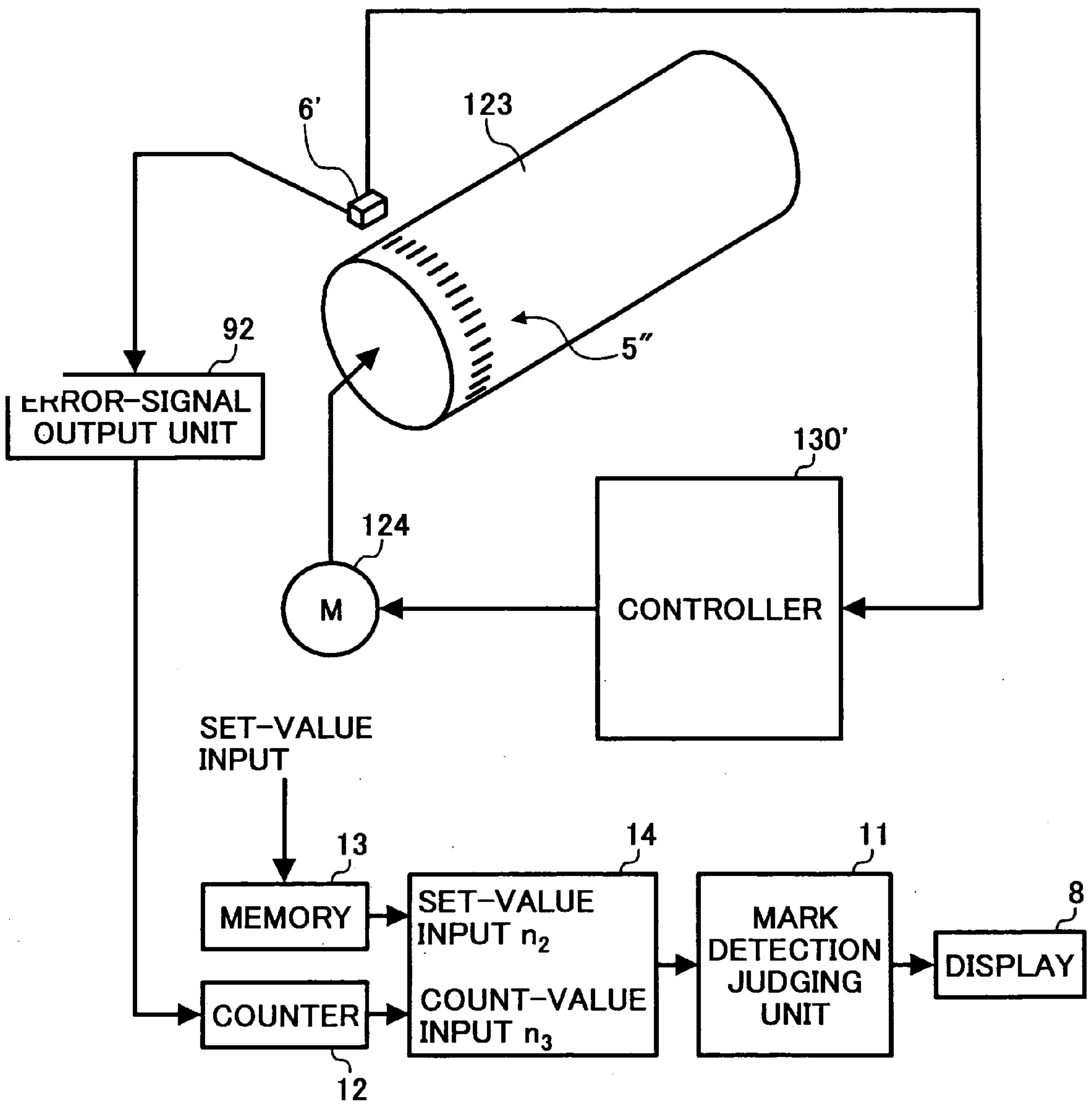
FIG. 31 is a perspective view of a photosensitive-element driving unit according to an embodiment C2 of the present invention.

FIG. 31 is a perspective view of a photosensitive-element driving unit according to an embodiment C2 of the present invention.

The embodiment C2 differs from the embodiment A2 only at a point that in the embodiment A2, the intermediate transfer belt 10' is let to be the endless moving-member, whereas in the embodiment C2 photosensitive drum 123 that rotates is let to be the endless moving-member.

The photosensitive-element driving unit includes the photosensitive drum 123 and the sensor 6'. The photosensitive drum 123 has the scale 5" to be detected, which is provided along the circumference of the photosensitive drum 123 at predetermined interval and which rotates. The sensor 6' is a detecting unit that outputs an analog alternating signal, which is modulated continuously upon detection of the scale 5".

A defective portion where the scale 5" is not detected to be at the predetermined interval is detected based on a change in an output level of the analog alternating signal that is output by the sensor 6'. When the defective portion is detected, a controller 130' changes a speed control (or position control) of the photosensitive drum 123, to the dummy-signal control, which differs from the normal control. The photosensitive-element driving unit includes the error-signal outputting section 92, the counter 12, the memory 13, the arithmetic unit 14, and the mark-detection judging section 11. The error-signal outputting section 92 outputs an error signal when the defective portion is detected, based on the change in the output level of the analog alternating signal. The counter 12 counts a wave number of an error signal that is output by the error-signal outputting section 92. The memory 13 stores a wave number $n_2$ of the error signal that is output from the error-signal outputting section 92 when the sensor 6' detects a normal portion of the scale 5" during the predetermined time $t_1$, which is set voluntarily. The arithmetic circuit 14 calculates a difference between a wave number stored in the memory 13 when the normal portion of the scale 5" is detected and a wave number $n_3$ of the error signal that is counted by the counter 12 during a time interval same as the predetermined time $t_1$. The mark-detection judging section 11 functions as a warning display unit that controls to display warnings on the display 8. The warnings displayed on the display 8 include warnings such as the indication of degradation of the scale 5" and the change of a normal speed control (or position control) to the dummy-signal control of the photosensitive drum 123. The mark-detection judging section 11 judges the scale 5" to be defective when the difference between the wave numbers calculated by the arithmetic circuit 14 becomes greater than the predetermined value and causes the display of the degradation of the scale 5".

The photosensitive-element driving unit according to the embodiment C2, similarly as in the case of the photosensitive-element driving unit according to the embodiment C1, can judge degradation of the scale 5" that is provided on the photosensitive drum 123. Therefore, it is possible to prevent the formation of a faulty image that has a color shift.

Figure 32:
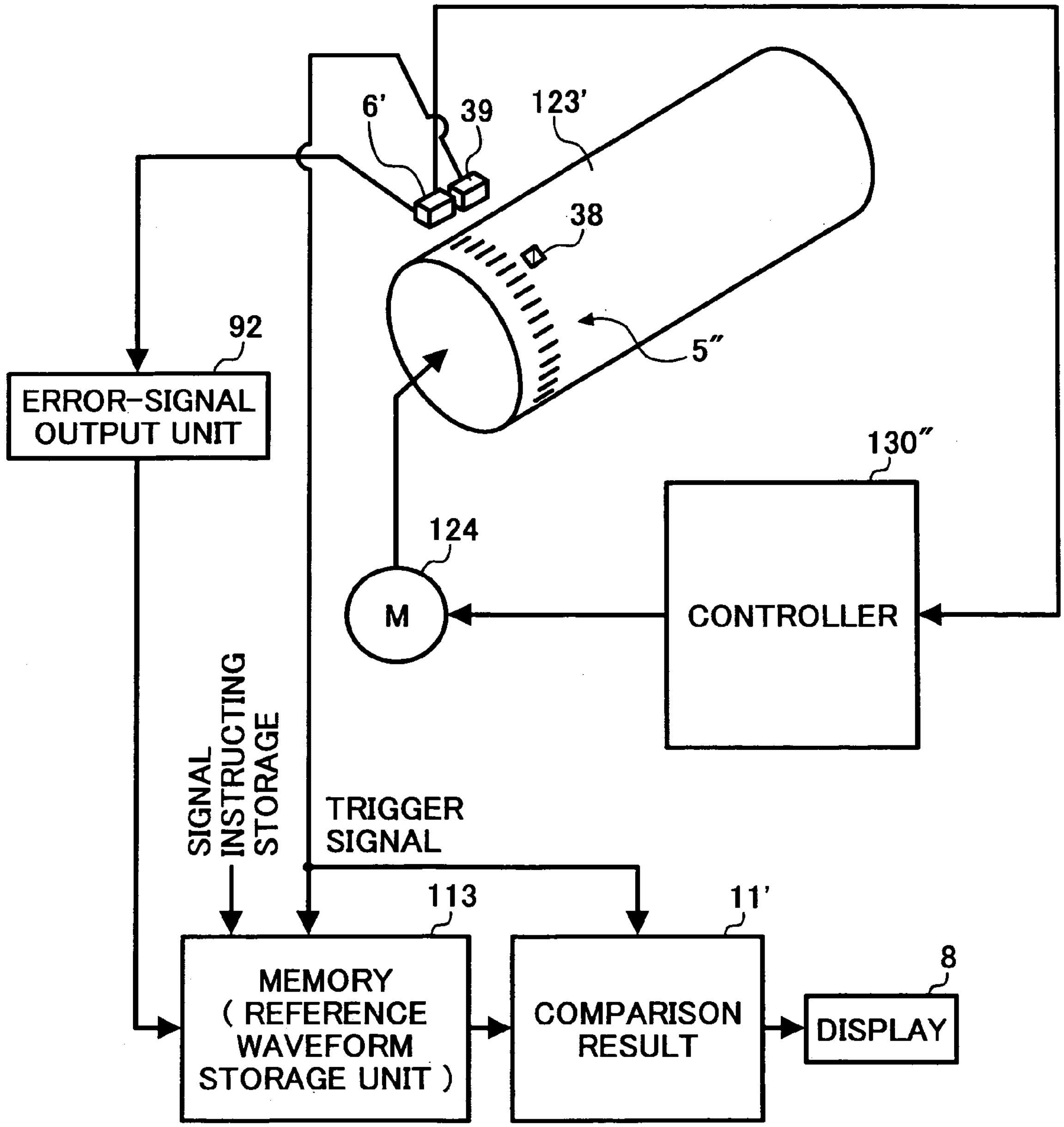
FIG. 32 is a perspective view of a photosensitive-element driving unit according to an embodiment C3 of the present invention.

FIG. 32 is a perspective view of a photosensitive-element driving unit according to an embodiment C3 of the present invention.

The embodiment C3 differs from the embodiment A6 only at a point that in the embodiment A6, the intermediate transfer belt 10' is let to be the endless moving-member, whereas in the embodiment C3, a photosensitive drum 123' that rotates is let to be the endless moving-moving member.

The photosensitive-element driving unit includes the photosensitive drum 123' and the sensor 6'. The photosensitive drum 123' has the scale 5" to be detected, which is provided along the circumference of the photosensitive drum 123' at predetermined interval and rotates. The sensor 6' is a detecting unit that outputs an analog alternating signal, which is modulated continuously upon detecting the scale 5".

A defective portion where the scale 5" is not detected to be at the predetermined interval is detected based on a change in an output level of the analog alternating signal that is output by the sensor 6'. When the defective portion is detected, a controller 130" changes a speed control (or position control) of the photosensitive drum 123' to the dummy-signal control, which differs from the normal control.

Moreover, this photosensitive-element driving unit includes a reference-position mark 38 and a reference-position mark sensor 39. The reference-position mark 38 indicates a reference position in the direction of rotation of the photosensitive-drum 123'. The reference-position mark sensor 39 detects the reference-position mark 38.

The photosensitive-element driving unit includes the error-signal outputting section 92, the memory 113, and the mark-detection judging section 11. The error-signal outputting section 92 outputs an error signal when the defective portion is detected, based on the change in the output level of the analog alternating signal. The memory 113 is a reference-waveform storage unit that stores a signal waveform, which is output from the error-signal outputting section 92 throughout one rotation of the photosensitive drum 123' at a timing of a start and an end of waveform fetching, the timing being a trigger signal when the reference-position mark sensor 39 detects the reference-position mark 38 in the initial stage of the use of the photosensitive drum 123'. The mark-detection judging section 11 functions as a warning display unit that controls to display on the display 8, warnings such as the indication of degradation of the scale 5" and the change of the normal speed control to an alternate speed control (dummy-signal control). The mark-detection judging section 11 compares a signal waveform, which is for reference and the signal waveform, which is output from the error-signal outputting section 92. If the resultant value of the waveform comparison is greater than the predetermined value, the mark-detection judging section 11 judges the scale 5" to be defective and displays the warning indicating the degradation of the scale 5'.

The photosensitive-element driving unit according to the embodiment C3, similarly as in the case of the photosensitive-element driving units according to the embodiments C1 and C2, can judge degradation of the scale 5" that is provided on the photosensitive drum 123'. Therefore, it is possible to prevent the formation of a faulty image that has color shift.

According to the endless-moving-member driving unit, the image forming apparatus, the photosensitive-element driving unit, and the method of degradation process of endless moving-member according to the present invention, as the proportion of the portions to be detected, which are provided at predetermined interval on the endless moving-member not being detected, increases particularly with the elapsed time, the portions to be detected are judged to be defective and the control of the speed and of the position is judged to have changed to a control other than that in the normal case. A warning that indicates the change in the control is displayed. This enables the user to know assuredly in the initial stage or with the elapsing of time, about the degradation of the portions to be detected on the endless moving-member and about the change in the control of the speed or position of the endless moving-member (alternate control).

In the photosensitive-element driving unit according to the embodiments of the present invention, as the proportion of portions to be detected, which are provided at predetermined interval on the endless moving-member not being detected, increases particularly with the elapsed time, the portions to be detected are judged to be defective and the control of the speed and the position is judged to have changed to the control other than that in the normal case. The warning that indicates the change in the control is displayed. This enables the user to know assuredly in the initial stage or with the elapsing of time, about the degradation of the portions to be detected on the endless moving-member and about the change in the control of the speed or position of the endless moving-member (alternate control).

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An endless-moving-member driving unit that includes an endless moving-member including portions to be detected that are formed at a predetermined interval and a detecting unit that detects the portions to be detected and outputs a result of detection as a binary signal, the endless-moving-member driving unit changing a control of any of a speed and a position of the endless moving-member to a different control from a normal control when the portions to be detected are not detected at the predetermined interval, based on a change in the binary signal, comprising:

a counter that counts a wave number of the binary signal;

a storage unit that stores the wave number of the binary signal that is output when portions to be detected are detected;

a calculating unit that calculates a difference between the wave number stored in the storage unit and the wave number counted by the counter in a predetermined time arbitrarily set; and a warning display unit that displays a warning that indicates a state in which the different control from the normal control is executed when the difference between the wave numbers calculated exceeds a predetermined value.

2. The endless-moving-member driving unit according to claim 1, wherein the predetermined time is a time taken for one rotation of the endless moving-member.

3. The endless-moving-member driving unit according to claim 1, comprising:

a reference-position mark that indicates a reference position in a direction of rotation of the endless moving-member; and a reference-position mark detecting unit that detects the reference-position mark, wherein the predetermined time is a time from detection of the reference-position mark on the endless moving-member that rotates, by the reference-position mark detecting unit to a subsequent detection of the reference-position mark on the endless moving-member, and a trigger signal at a time when the reference-position mark detecting unit detects the reference position mark is used as a timing to start storage of the wave number in the storage unit and the trigger signal is used as a timing to start counting of the wave number by the counter.

4. The endless-moving-member driving unit according to claim 3, wherein the endless moving-member has in a direction of rotation, a joint where the portions to be detected are not at the predetermined interval, the reference-position mark and the reference-position mark detecting unit are provided corresponding to the joint portion, and while the reference-position mark detecting unit detects the reference-position mark, the control of any of a speed and a position of the endless moving-member changes to the control that is different from the normal control.

5. The endless-moving-member driving unit according to claim 4, wherein a width of the reference-position mark in the direction of rotation of the endless moving-member is greater than the width of the joint in the direction of rotation.

6. The endless-moving-member driving unit according to claim 3, wherein the reference-position mark serves as a stopping-position specifying mark as well, which becomes a stopping-position reference while stopping the endless moving-member.

7. The endless-moving-member driving unit according to claim 6, wherein a stopping position in a direction of rotation of the endless moving-member for which the stopping-position specifying mark is a reference, is shifted in the direction of rotation so that the stopping position is not the same position every time.

8. The endless-moving-member driving unit according to claim 6, wherein a stopping position of the endless moving-member is a position where portions of the portions to be detected of the endless moving-member are not detected to be at predetermined interval, coincide with a roller that rotatably supports the endless moving-member.

9. The endless-moving-member driving unit according to claim 1, wherein the warning display unit includes a plurality of the predetermined values, judges in stages the portions to be detected to be defective whenever each of the predetermined values becomes greater than the difference between the wave numbers, displays warnings according to degradation of the portion to be detected and the warning, which indicates a change in the control of any of a speed and a position of the endless moving-member, to the control that is different from the normal control.

10. An endless-moving-member driving unit that includes an endless moving-member including portions to be detected that are formed at a predetermined interval and a detecting unit that detects the portions to be detected and outputs an analog alternating signal modulated continuously, the endless-moving-member driving unit changing a control of any of a speed and a position of the endless moving-member to a different control from a normal control when the portions to be detected are not detected at the predetermined interval, based on a change in an output level of the analog alternating signal, comprising:

an error-signal outputting unit that outputs an error signal when the portions to be detected are not detected at the predetermined interval based on the change in the output level of the analog alternating signal;

a counter that counts a wave number of the error signal;

a storage unit that stores a wave number of the error signal that is output when the portions to be detected are detected within a predetermined time arbitrarily set;

a calculating unit that calculates a difference between the wave number stored in the storage unit and a wave number that is counted by the counter within a same period of time as the predetermined time; and a warning display unit that displays a warning that indicates a change in the control of any of a speed and a position of the endless moving-member into the control that is different from the normal control when the difference between the wave numbers that is calculated by the calculating unit becomes greater than a predetermined value.

11. The endless-moving-member driving unit according to claim 10, wherein the predetermined time is a time taken for one rotation of the endless moving-member.

12. The endless-moving-member driving unit according to claim 10, comprising:

a reference-position mark that indicates a reference position in a direction of rotation of the endless moving-member; and a reference-position mark detecting unit that detects the reference-position mark, wherein the predetermined time is a time from detection of the reference-position mark on the endless moving-member that rotates, by the reference-position mark detecting unit to a subsequent detection of the reference-position mark on the endless moving-member, and a trigger signal at a time when the reference-position mark detecting unit detects the reference position mark is used as a timing to start storage of the wave number in the storage unit and the trigger signal is used as a timing to start counting of the wave number by the counter.

13. The endless-moving-member driving unit according to claim 12, wherein the endless moving-member has in a direction of rotation, a joint where the portions to be detected are not at the predetermined interval, the reference-position mark and the reference-position mark detecting unit are provided corresponding to the joint portion, and while the reference-position mark detecting unit detects the reference-position mark, the control of any of a speed and a position of the endless moving-member changes to the control that is different from the normal control.

14. The endless-moving-member driving unit according to claim 13, wherein a width of the reference-position mark in the direction of rotation of the endless moving-member is greater than the width of the joint in the direction of rotation.

15. The endless-moving-member driving unit according to claim 12, wherein the reference-position mark serves as a stopping-position specifying mark as well, which becomes a stopping-position reference while stopping the endless moving-member.

16. The endless-moving-member driving unit according to claim 15, wherein a stopping position in a direction of rotation of the endless moving-member for which the stopping-position specifying mark is a reference, is shifted in the direction of rotation so that the stopping position is not the same position every time.

17. The endless-moving-member driving unit according to claim 15, wherein a stopping position of the endless moving-member is a position where portions of the portions to be detected of the endless moving-member are not detected to be at predetermined interval, coincide with a roller that rotatably supports the endless moving-member.

18. The endless-moving-member driving unit according to claim 10, wherein the warning display unit includes a plurality of the predetermined values, judges in stages the portions to be detected to be defective whenever each of the predetermined values becomes greater than the difference between the wave numbers, displays warnings according to degradation of the portion to be detected and the warning, which indicates a change in the control of any of a speed and a position of the endless moving-member, to the control that is different from the normal control.

* * * * *